(12) United States Patent
Enomoto et al.

(10) Patent No.: US 9,954,651 B2
(45) Date of Patent: Apr. 24, 2018

(54) MOBILE STATION APPARATUS, COMMUNICATION METHOD, AND INTEGRATED CIRCUIT

(75) Inventors: Masayuki Enomoto, Osaka (JP); Tatsushi Aiba, Osaka (JP); Shoichi Suzuki, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 149 days.

(21) Appl. No.: 13/579,219

(22) PCT Filed: Feb. 15, 2011

(86) PCT No.: PCT/JP2011/053088
§ 371 (c)(1),
(2), (4) Date: Aug. 15, 2012

(87) PCT Pub. No.: WO2011/102325
PCT Pub. Date: Aug. 25, 2011

(65) Prior Publication Data
US 2012/0307781 A1    Dec. 6, 2012

(30) Foreign Application Priority Data

Feb. 22, 2010 (JP) ................................ 2010-035743

(51) Int. Cl.
*H04W 72/04* (2009.01)
*H04L 1/18* (2006.01)
(Continued)

(52) U.S. Cl.
CPC ............ *H04L 1/1861* (2013.01); *H04L 5/001* (2013.01); *H04L 5/0055* (2013.01); *H04W 76/048* (2013.01); *H04W 72/04* (2013.01)

(58) Field of Classification Search
CPC ..... H04L 1/1861; H04L 5/001; H04L 5/0055; H04W 28/04; H04W 72/04; H04W 76/048
(Continued)

(56) References Cited

U.S. PATENT DOCUMENTS 7,437,172 B2    10/2008    Chen et al.
2004/0203463 A1*    10/2004    Chen ..................... H04L 1/0061
455/67.13
(Continued)

FOREIGN PATENT DOCUMENTS

WO    WO 2009/022790 A1    2/2009
WO    WO 2009/153165 A1    12/2009

OTHER PUBLICATIONS

Texas Instruments; Issues on Carrier Aggregation for Advanced E-UTRA, 3GPP TSG RAN WG1 #55 R1-084443, 3GPP, 2008-11-101 pp. 1-5; Nov. 2008.*
(Continued)

*Primary Examiner* — Andrew Lai
*Assistant Examiner* — Mahmudul Hasan
(74) *Attorney, Agent, or Firm* — Greer Burns & Crain Ltd.

(57) ABSTRACT

Disclosed is a mobile communication system and a mobile communication method which enable high-quality transmission and reception of hybrid automatic repeat request (HARQ) control information when a base station apparatus and a mobile station apparatus communicate using a broad frequency band formed by a plurality of component carriers. In a mobile communication system where a base station apparatus and a mobile station apparatus communicate using a plurality of downlink component carriers, the base station apparatus allocates a physical uplink shared channel (PUSCH) resource to the mobile station apparatus for the
(Continued)

transmission of HARQ control information, and the mobile station apparatus uses the PUSCH resource to transmit HARQ control information to the base station apparatus.

12 Claims, 14 Drawing Sheets

(51) Int. Cl.
*H04W 76/04* (2009.01)
*H04L 5/00* (2006.01)

(58) Field of Classification Search
USPC ............ 370/329, 244; 455/450, 522, 68, 73; 375/262, 260
See application file for complete search history.

(56) References Cited

U.S. PATENT DOCUMENTS

| | | | |
|---|---|---|---|
| 2006/0153061 A1* | 7/2006 | Nishio | 370/208 |
| 2007/0060146 A1* | 3/2007 | Won | H04L 1/1867 455/445 |
| 2009/0046627 A1* | 2/2009 | Xu | H04W 72/1257 370/328 |
| 2009/0046650 A1* | 2/2009 | Dalsgaard et al. | 370/329 |
| 2009/0168731 A1* | 7/2009 | Zhang et al. | 370/336 |
| 2009/0258664 A1* | 10/2009 | Huan | 455/522 |
| 2009/0316575 A1* | 12/2009 | Gholmieh et al. | 370/225 |
| 2010/0067457 A1* | 3/2010 | Wang | H04W 72/0406 370/329 |
| 2010/0074120 A1* | 3/2010 | Bergman et al. | 370/244 |
| 2010/0098012 A1* | 4/2010 | Bala et al. | 370/329 |
| 2010/0118720 A1* | 5/2010 | Gauvreau et al. | 370/252 |
| 2010/0130137 A1* | 5/2010 | Pelletier | H04W 72/04 455/68 |
| 2010/0130219 A1* | 5/2010 | Cave | H04W 72/02 455/450 |
| 2010/0165835 A1* | 7/2010 | Hsu et al. | 370/225 |
| 2010/0172428 A1* | 7/2010 | Pani | H04L 1/0026 375/262 |
| 2010/0195605 A1* | 8/2010 | Suzuki et al. | 370/329 |
| 2010/0232373 A1* | 9/2010 | Nory | H04W 72/1289 370/329 |
| 2010/0260120 A1* | 10/2010 | Shen | 370/329 |
| 2010/0291937 A1* | 11/2010 | Hu | H04L 1/1854 455/450 |
| 2011/0002281 A1* | 1/2011 | Terry | H04W 52/0216 370/329 |
| 2011/0034175 A1* | 2/2011 | Fong et al. | 455/450 |
| 2011/0205976 A1* | 8/2011 | Roessel | H04L 5/001 370/329 |
| 2011/0211510 A1* | 9/2011 | Kim | H04L 1/16 370/311 |
| 2011/0243088 A1* | 10/2011 | Ahn | H04L 1/0023 370/329 |
| 2011/0261679 A1* | 10/2011 | Li et al. | 370/216 |
| 2011/0261746 A1* | 10/2011 | Seo et al. | 370/315 |
| 2011/0268032 A1* | 11/2011 | Kim | H04L 1/1671 370/328 |
| 2011/0299452 A1* | 12/2011 | Seo et al. | 370/315 |
| 2011/0305290 A1* | 12/2011 | Kim et al. | 375/267 |
| 2012/0014296 A1* | 1/2012 | Sung et al. | 370/280 |
| 2012/0033647 A1* | 2/2012 | Moon | H04W 74/006 370/336 |
| 2012/0063413 A1* | 3/2012 | Kroener | H04W 72/12 370/330 |
| 2013/0153298 A1* | 6/2013 | Pietraski | E21B 7/04 175/45 |

OTHER PUBLICATIONS

LG Electronics; UL ACK/NACK Control Channel Design; 3GPP TSG RAN WG1 #57 R1-092123.3GPP; May 4, 2009; May 2009.*
R1-101144, 3GPP TSG RAN WG1 Meeting #60 San Francisco, USA, Feb. 22-26, 2010 Agenda item: 7.1.3 Source: Samsung Title: Component carrier activation and deactivation.*
RI-100366; "ACK/NACK transmission schemes for carrier aggregation", 3GPP TSG RAN WGI #59bis.*
R1-101144; 3GPP TSG RAN WG1 Meeting #60; Title: Component carrier activation and deactivation; Source : Samsung; San Francisco, USA, Feb. 22-26, 2010.*
R1-100366; 3GPP TSG RAN WG1 Meeting #59bis Valencia, Spain, Jan. 18th-22nd, 2010 Title: ACKINACK transmission schemes for carrier aggregation.*
3GPP TSG RAN WG1 Meeting #60; R1-101144 San Francisco, USA, Feb. 22nd-26th, 2010 Title: Component carrier activation and deactivation.*
Samsung: Component carrier activation and deactivation, 3GPP TSG RAN WG1 Meeting #60, R1-101144, USA, Feb. 22-26, 2010.
Int'l. Search Report issued in Int'l. App. No. PCT/JP2011/053088, mailed May 10, 2011.
Texas Instruments; Issues on Carrier Aggregation for Advanced E-UTRA, 3GPP TSG RAN WG1 #55 R1-084443, 3GPP, Nov. 10, 2008; pp. 1-5; Nov. 2008.
LG Electronics; UL ACK/NACK Control Channel Design; 3GPP TSG RAN WG1 #57 R1-092123. 3GPP; May 4, 2009; May 2009.
Ericsson; Carrier Aggregation in LTE-Advanced; 3GPP TSG RAN WG1 #53bis, R1-082468; Jun. 30-Jul. 4, 2008.
Nokia Siemens Networks, Nokia; Performance Comparison of PUCCH ACK/NACK Transmission Schemes for CC Aggregation; 3GPP TSG RAN WG1 Meeting #60; Feb. 22-26, 2010.
Panasonic; ACK/NACK Transmission Schemes for Carrier Aggregation; 3GPP TSG RAN WG1 #59bis, R1-100366; Jan. 18-22, 2010.
Ericsson et al: "On PUCCH Resource Allocation for Carrier Aggregation", 3GPP DRAFF; R1-100845, 3rd Generation Partnership Project (3GPP), Mobile Compefence Centre; 650, Route Des Lucioles; F-06921 Sophia-Antipolis Cedex; France, vol. RAN WG1, No. San Francisco, USA; 20100222, Feb. 16, 2010(Feb. 16, 2010), XP050418458, [retrieved on Feb. 16, 2010].
NEC GROUP: "PDCCH Structure for LTE-Advanced System", 3GPP DRAFT; R1-091692 PDCCH Structure for LTE-Advanced System, 3rd Generation Partnership Project (3GPP), Mobile Competence Centre; 650, Route Des Lucioles; F-06921 Sophia-Antipolis Cedex; France, No. San Francisco, USA; 20090428, Apr. 28, 2009 (Apr. 28, 2009), XP05033923 I, [retrieved on Apr. 28, 2009].

* cited by examiner

| BIT ALLOCATION | ACK or NACK |
|---|---|
| "0" | ACK |
| "1" | NACK |

(B)

| BIT ALLOCATION | PRESENCE/ABSENCE OF DTX |
|---|---|
| "0" | PRESENCE OF DTX |
| "1" | ABSENCE OF DTX |

| BIT ALLOCATION | ACK or NACK |
|---|---|
| "00" | ACK, ACK |
| "01" | ACK, NACK |
| "10" | NACK, ACK |
| "11" | NACK, NACK |

(B)

| BIT ALLOCATION | PRESENCE/ABSENCE OF DTX |
|---|---|
| "0" | PRESENCE OF DTX |
| "1" | ABSENCE OF DTX |

| 1 | 2 | 3 | 4 | 5 |
|---|---|---|---|---|
| DTX for DCC1 | DTX for DCC2 | DTX for DCC3 | DTX for DCC4 | DTX for DCC5 |

| 6 | 7 | 8 | 9 | 10 |
|---|---|---|---|---|
| ACK/NACK for DCC1 | ACK/NACK for DCC2 | ACK/NACK for DCC3 | ACK/NACK for DCC4 | ACK/NACK for DCC5 |

(B)

| 1 | 2 | 3 | 4 | 5 |
|---|---|---|---|---|
| DTX for DCC1 | ACK/NACK for DCC1 | DTX for DCC2 | ACK/NACK for DCC2 | DTX for DCC3 |

| 6 | 7 | 8 | 9 | 10 |
|---|---|---|---|---|
| ACK/NACK for DCC3 | DTX for DCC4 | ACK/NACK for DCC4 | DTX for DCC5 | ACK/NACK for DCC5 |

| 1 | 2 | 3 | 4 | 5 |
|---|---|---|---|---|
| DTX for DCC1 | DTX for DCC2 | DTX for DCC4 | DTX for DCC5 | ACK/NACK for DCC5 |

| 6 | 7 | 8 | 9 |
|---|---|---|---|
| ACK/NACK for DCC1 | ACK/NACK for DCC2 | ACK/NACK for DCC4 | ACK/NACK for DCC5 |

(B)

| 1 | 2 | 3 | 4 | 5 |
|---|---|---|---|---|
| DTX for DCC1 | ACK/NACK for DCC1 | DTX for DCC2 | ACK/NACK for DCC2 | ACK/NACK for DCC3 |

| 6 | 7 | 8 | 9 |
|---|---|---|---|
| DTX for DCC4 | ACK/NACK for DCC4 | DTX for DCC5 | ACK/NACK for DCC5 |

MOBILE STATION APPARATUS, COMMUNICATION METHOD, AND INTEGRATED CIRCUIT

This application is a U.S. National Phase under 35 U.S.C. § 371 of International Application No. PCT/JP2011/053088, filed Feb. 15, 2011.

TECHNICAL FIELD

The present invention relates to a mobile communication system made up of a base station apparatus and a mobile station apparatus, and a mobile communication method.

BACKGROUND ART

An international standardization project, 3GPP (3rd Generation Partnership Project) is discussing specifications of a network developed from W-CDMA (Wideband-Code Division Multiple Access) and GSM (Global System for Mobile Communications) as a mode of next-generation cellular mobile communication.

3GPP has been discussing cellular mobile communication systems for a long time and has standardized the W-CDMA as a third-generation cellular mobile communication system. HSDPA (High-Speed Downlink Packet Access) with higher communication speed has been standardized and the service is operated. 3GPP is currently also discussing development of the third-generation radio access technology (Long Term Evolution, hereinafter referred to as "LTE") and LTE Advanced (hereinafter referred to as "LTE-A") aimed at further increase in communication speed.

The OFDMA (Orthogonal Frequency Division Multiple Access) and the SC-FDMA (Single Carrier-Frequency Division Multiple Access) are using subcarriers orthogonal to each other to perform user-multiplexing and are discussed as communication schemes in LTE. Specifically, the OFDMA is a multi-carrier communication scheme and is proposed for downlink, and the SC-FDMA is a single-carrier communication scheme and is proposed for uplink.

On the other hand, for communication schemes in LTE-A, it is discussed to introduce the OFDMA for downlink and the Clustered-SC-FDMA (Clustered-Single Carrier-Frequency Division Multiple Access, also referred to as DFT-s-OFDM with Spectrum Division Control or DFT-precoded OFDM) for uplink in addition to the SC-FDMA. The SC-FDMA and the Clustered-SC-FDMA proposed as uplink communication schemes in LTE and LTE-A are characterized in that PAPR (Peak to Average Power Ratio) at the time of transmission of data (information) can be suppressed to a lower level.

While a typical mobile communication system uses a continuous frequency band, it is discussed for LTE-A to use a plurality of continuous/non-continuous frequency bands (hereinafter referred to as "carrier elements, carrier components (CC)" or "element carriers, component carriers (CC)") in a composite manner to implement operation as one frequency band (wide frequency band) (frequency band aggregation, also referred to as spectrum aggregation, carrier aggregation, and frequency aggregation). It is also proposed to give different frequency bandwidths to a frequency band used for downlink communication and a frequency band used for uplink communication so that a base station apparatus and a mobile station apparatus more flexibly use a wider frequency band to perform communication (asymmetric frequency band aggregation: asymmetric carrier aggregation) (Nonpatent Literature 1).

FIG. 13 is a diagram for explaining frequency band aggregation in a conventional technique. Giving the same bandwidth to a frequency band used for downlink (DL) communication and a frequency band used for uplink (UL) communication as depicted in FIG. 13 is also referred to as symmetric frequency band aggregation (symmetric carrier aggregation). As depicted in FIG. 13, a base station apparatus and a mobile station apparatus use a plurality of component carriers that are continuous/non-continuous frequency bands in a composite manner, thereby performing communication in a wider frequency band made up of a plurality of component carriers. In this case, by way of example, it is depicted that a frequency band used for the downlink communication with a bandwidth of 100 MHz (hereinafter also referred to as a DL system band or a DL system bandwidth) is made up of five component carriers (DCC1: Downlink Component Carrier 1, DCC2, DCC3, DCC4, and DCC5) each having a bandwidth of 20 MHz. By way of example, it is also depicted that a frequency band used for the uplink communication with a bandwidth of 100 MHz (hereinafter also referred to as a UL system band or a UL system bandwidth) is made up of five component carriers (UCC1: Uplink Component Carrier 1, UCC2, UCC3, UCC4, and UCC5) each having a bandwidth of 20 MHz.

In FIG. 13, downlink channels such as a physical downlink control channel (hereinafter, PDCCH) and a physical downlink shared channel (hereinafter, PDSCH) are mapped on each of the downlink component carriers. And the base station apparatus uses the PDCCH to transmit to the mobile station apparatus the control information for transmitting a downlink transport block transmitted by using the PDSCH mapped on each of the downlink component carriers (such as resource allocation information, MCS (Modulation and Coding Scheme) information, and HARQ (Hybrid Automatic Repeat ReQuest) process information) (uses the PDCCH to allocate the PDSCH to the mobile station apparatus) and uses the PDSCH to transmit the downlink transport block to the mobile station apparatus.

The mobile station apparatus transmits the control information of HARQ (hereafter described as HARQ control information) on the basis of a codeword (CW, also referred to as code word). A CW is a bit sequence to which a transport block is mapped before channel encoding, and is a unit of channel encoding. The spatial multiplexing transmission in MIMO utilizes a plurality of CWs to generate transmission sequences. If the spatial multiplexing transmission in MIMO is performed, encoding is achieved with up to two CWs to generate transmission sequences. For example, in the spatial multiplexing transmission in MIMO, if the spatial multiplexing number (the number of layers) is two, spatial multiplexing sequences (layers) are encoded with respective different CWs to generate transmission sequences. If the number of layers is four, encoding is achieved with one CW per two layers to generate transmission sequences. Since transmission sequences are generated with a plurality of CWs in the spatial multiplexing transmission in MIMO in this way, the transmission sequences encoded with respective CWs have respective different transmission characteristics and, therefore, the HARQ control information must be transmitted for each transmission sequence encoded with each CW. Since the HARQ control information is transmitted for each CW of downlink signals (downlink transport blocks), two pieces of the HARQ control information are transmitted if the spatial multiplexing transmission in MIMO is performed, for example.

Uplink channels such as a physical uplink control channel (hereinafter, PUCCH) and a physical uplink shared channel (hereinafter, PUSCH) are mapped on each of the uplink component carriers. And the mobile station apparatus uses the PUCCH and/or the PUSCH mapped on each of the uplink component carriers to transmit to the base station apparatus the HARQ control information for the PDCCH and/or the downlink transport block. The HARQ control information is a signal (information) indicative of ACK/NACK (Positive Acknowledgement/Negative Acknowledgement, ACK signal or NACK signal) and/or a signal (information) indicative of DTX (Discontinuous Transmission) for the PDCCH and/or the downlink transport block. The DTX is a signal (information) indicating that the mobile station apparatus cannot detect the PDCCH from the base station apparatus. In FIG. 13, any of downlink/uplink channels such as the PDCCH, the PDSCH, the PUCCH, and the PUSCH may not be mapped on some downlink/uplink component carriers.

Similarly, FIG. 14 is a diagram for explaining asymmetric frequency band aggregation in a conventional technique. As depicted in FIG. 14, the base station apparatus and the mobile station apparatus give different bandwidths to a frequency band used for downlink communication and a frequency band used for uplink communication and use component carriers making up these frequency bands in a composite manner, thereby performing communication in a wider frequency band. In this case, by way of example, it is depicted that a frequency band used for the downlink communication with a bandwidth of 100 MHz is made up of five downlink component carriers (DCC1, DCC2, DCC3, DCC4, and DCC5) each having a bandwidth of 20 MHz, and that a frequency band used for the uplink communication with a bandwidth of 40 MHz is made up of two component carriers (UCC1 and UCC2) each having a bandwidth of 20 MHz. In FIG. 14, downlink/uplink channels are mapped on each of the downlink/uplink component carriers, and the base station apparatus uses the PDSCH allocated by the PDCCH to transmit the transport block to the mobile station apparatus and the mobile station apparatus uses the PUSCH and/or the PUSCH to transmit the HARQ control information to the base station apparatus.

To transmit the HARQ control information for transmission of PDCCHs and/or PDSCHs on a plurality of downlink component carriers, the mobile station apparatus must indicate ACK, NACK, and DTX for a PDCCH and/or a PDSCH transmitted on each of the component carriers. For example, if PDCCHs and/or PDSCHs are transmitted on five downlink component carriers, the mobile station apparatus needs to notify any one of ACK, NACK, and DTX and therefore must transmit information capable of indicating the fifth power of three types of state (243 types of state) to the base station apparatus.

To represent these types of state as bit information, eight bits (capable of representing 256 types of state) are required. If the spatial multiplexing transmission in MIMO is performed and transmission is executed with a plurality of CWs, ACK and NACK must be transmitted for each CW on each component carrier. For example, if a PDSCH is transmitted with two CWs applied in MIMO on one downlink component carrier, ACK and NACK must be represented for a first CW; ACK and NACK must be represented for a second CW; and DTX must be represented to indicate that no PDCCH is detected on the downlink component carrier; and, therefore, five types of state ((ACK, ACK), (ACK, NACK), (NACK, ACK), (NACK, NACK), (DTX, DTX)) must be indicated. In case that PDSCHs with spatial multiplexing in MIMO applied are transmitted on five downlink component carriers, if two CWs are applied to each of the component carriers, ACK and NACK for a first CW and ACK, NACK, and DTX for a second CW must be represented in each of the downlink component carriers and, therefore, the fifth power of five types of state (3125 types of state) must be indicated. To represent these types of state as bit information, 12 bits (capable of representing 4096 types of state) are required.

Nonpatent Literature 2 describes that, In case that a base station apparatus allocates two PUCCH resources to a mobile station apparatus and the mobile station apparatus respectively allocates PUCCH resources for different antennas to transmit different pieces of information through the respective antennas to the base station apparatus, more bit information (10-bit or more information) can be transmitted, and this transmission scheme can be applied to transmission of ACK/NACK to transmit ACK, NACK, and DTX described above.

Nonpatent Literature 3 proposes a transmission method in which a base station apparatus allocates to a mobile station apparatus a plurality of PUCCH resources for transmission of ACK and NACK such that the mobile station apparatus selects one PUCCH resource from the allocated PUCCH resources to transmit ACK and NACK to the base station apparatus by using the selected PUCCH resource. For example, the base station apparatus allocates to the mobile station apparatus the PUCCH resources corresponding to respective PDSCHs transmitted on a plurality of downlink component carriers and the mobile station apparatus selects one PUCCH resource from a plurality of the PUCCH resources to transmit ACK and NACK by using the selected PUCCH resource. The base station apparatus extracts the PUCCH resource selected by the mobile station apparatus in addition to bit information transmitted by the mobile station apparatus, thereby enabling the base station apparatus and the mobile station apparatus to transmit/receive more information indicative of ACK and NACK.

PRIOR ART DOCUMENTS

Nonpatent Literatures

Nonpatent Literature 1: "Carrier aggregation in LTE-Advance", 3GPP TSG RAN WG1 #53bis, R1-082468
Nonpatent Literature 2: "Performance Comparison of PUCCH ACK/NACK transmission schemes for CC aggregation", 3GPP TSG RAN WG1 #60, R1-101418
Nonpatent Literature 3: "ACK/NACK transmission schemes for carrier aggregation", 3GPP TSG RAN WG1 #59bis, R1-100366

SUMMARY OF THE INVENTION

Problem to be Solved by the Invention

However, in a conventional technique, in case that a base station apparatus and a mobile station apparatus use a wide frequency band made up of a plurality of component carriers to transmit/receive a downlink signal and to transmit/receive HARQ control information for the signal, what type of exchange is made is not clarified. If a base station apparatus and a mobile station apparatus transmit/receive the HARQ control information, the mobile station apparatus must ensure higher quality of the HARQ control information for transmission to the base station apparatus.

In other words, in a conventional technique, in case that a base station apparatus and a mobile station apparatus use a wide frequency band made up of a plurality of component carriers to transmit/receive a downlink signal and to transmit/receive the HARQ control information for the signal, since what type of exchange is specifically made to transmit/receive the HARQ control information is not clarified, quality deteriorates in the HARQ control information transmitted from the mobile station apparatus and, as a result, throughput of a mobile communication system is problematically reduced.

The present invention was conceived in view of the situations and it is therefore an object of the present invention to provide a mobile station apparatus, a communication method, and an integrated circuit which can transmit/receive the HARQ control information with high quality in case that the base station apparatus and the mobile station apparatus communicate between them by using a wide frequency band made up of a plurality of component carriers.

Means for Solving the Problem (1) To accomplish the above purpose, the present invention has taken the following measures. That is, a mobile station apparatus of the present invention is a mobile station apparatus which is capable of communicating with a base station apparatus on downlink component carriers, the mobile station apparatus comprising: a transmitting unit configured to transmit, to the base station apparatus, information indicative of one or more negative acknowledgements for one or more downlink transport blocks associated with a downlink component carrier deactivated by the base station apparatus, the deactivated downlink component carrier being included in the downlink component carriers.

(2) A mobile station apparatus which is capable of communicating with a base station apparatus on downlink component carriers, the mobile station apparatus comprising: a transmitting unit configured to transmit, to the base station apparatus, information indicative of one or more discontinuous transmissions for one or more downlink transport blocks associated with a downlink component carrier deactivated by the base station apparatus, the deactivated downlink component carrier being included in the downlink component carriers.

(3) A mobile station apparatus which is capable of communicating with a base station apparatus on downlink component carriers, the mobile station apparatus comprising: a transmitting unit configured to transmit, to the base station apparatus, information indicative of one or more negative acknowledgements/discontinuous transmissions for one or more downlink transport blocks associated with a downlink component carrier deactivated by the base station apparatus, the deactivated downlink component carrier being included in the downlink component carriers.

(4) The mobile station apparatus further comprise a scheduling unit configured not to monitor a physical downlink control channel on the deactivated downlink component carrier.

(5) A base station apparatus which is capable of communicating with a mobile station apparatus on downlink component carriers, the base station apparatus, comprising: a receiving unit configured to receive, from the mobile station apparatus, information indicative of one or more negative acknowledgements for one or more downlink transport blocks associated with a downlink component carrier that is deactivated, the deactivated downlink component carrier being included in the downlink component carriers.

(6) A base station apparatus which is capable of communicating with a mobile station apparatus on downlink component carriers, the base station apparatus comprising: a receiving unit configured to receive, from the mobile station apparatus, information indicative of one or more discontinuous transmissions for one or more downlink transport blocks associated with a downlink component carrier that is deactivated, the deactivated downlink component carrier being included in the downlink component carriers.

(7) A base station apparatus which is capable of communicating with a mobile station apparatus on downlink component carriers, the base station apparatus comprising: a receiving unit configured to receive, from the mobile station apparatus, information indicative of one or more negative acknowledgements/discontinuous transmissions for one or more downlink transport blocks associated with a downlink component carrier that is deactivated, the deactivated downlink component carrier being included in the downlink component carriers.

(8) The base station apparatus further comprises a scheduling unit configured not to set a physical downlink control channel on the deactivated downlink component carrier.

(9) An integrated circuit used in a mobile station apparatus which is capable of communicating with a base station apparatus on downlink component carriers, the integrated circuit comprising: a control circuit which controls to transmit, to the base station apparatus, information indicative of one or more negative acknowledgements for one or more downlink transport blocks associated with a downlink component carrier deactivated by the base station apparatus, the deactivated downlink component carrier being included in the downlink component carriers.

(10) An integrated circuit used in a mobile station apparatus which is capable of communicating with a base station apparatus on downlink component carriers, the integrated circuit comprising: a control circuit which controls to transmit, to the base station apparatus, information indicative of one or more discontinuous transmissions for one or more downlink transport blocks associated with a downlink component carrier deactivated by the base station apparatus, the deactivated downlink component carrier being included in the downlink component carriers.

(11) An integrated circuit used in a mobile station apparatus which is capable of communicating with a base station apparatus on downlink component carriers, the integrated circuit comprising: a control circuit which controls to transmit, to the base station apparatus, information indicative of one or more negative acknowledgements/discontinuous transmissions for one or more downlink transport blocks associated with a downlink component carrier deactivated by the base station apparatus, the deactivated downlink component carrier being included in the downlink component carriers.

(12) The integrated circuit used in a mobile station apparatus further comprises a control circuit which controls not to monitor a physical downlink control channel on the deactivated downlink component carrier.

(13) An integrated circuit used in a base station apparatus which is capable of communicating with a mobile station apparatus on downlink component carriers, the integrated circuit comprising: a control circuit which controls to receive, from the mobile station apparatus, information indicative of one or more negative acknowledgements for one or more downlink transport blocks associated with a downlink component carrier that is deactivated, the deactivated downlink component carrier being included in the downlink component carriers.

(14) An integrated circuit used in a base station apparatus which is capable of communicating with a mobile station apparatus on downlink component carriers, the integrated circuit comprising: a control circuit which controls to receive, from the mobile station apparatus, information indicative of one or more discontinuous transmissions for one or more downlink transport blocks associated with a downlink component carrier that is deactivated, the deactivated downlink component carrier being included in the downlink component carriers.

(15) An integrated circuit used in a base station apparatus which is capable of communicating with a mobile station apparatus on downlink component carriers, the integrated circuit comprising: a control circuit which controls to receive, from the mobile station apparatus, information indicative of one or more negative acknowledgements/discontinuous transmissions for one or more downlink transport blocks associated with a downlink component carrier that is deactivated, the deactivated downlink component carrier being included in the downlink component carriers.

(16) The integrated circuit used in a base station apparatus further comprises a control circuit which controls not to set a physical downlink control channel on the deactivated downlink component carrier.

Effect of the Invention

The present invention can provide the mobile station apparatus, the communication method, and the integrated circuit which can transmit/receive the HARQ control information with high quality in case that the base station apparatus and the mobile station apparatus communicate between them by using a wide frequency band made up of a plurality of component carriers.

BRIEF DESCRIPTION OF DRAWINGS

FIG. 8 is a diagram of an example of bit allocation to which the second embodiment and the third embodiment are applicable.

FIG. 9 is a diagram of an example of bit allocation at the time of MIMO to which the second embodiment and the third embodiment are applicable.

FIG. 11 is a diagram of an example of arrangement of ACK, NACK, and DTX to which the second embodiment is applicable.

FIG. 12 is a diagram of an example of arrangement of ACK, NACK, and DTX to which the third embodiment is applicable.

MODES FOR CARRYING OUT THE INVENTION

Figure 1:
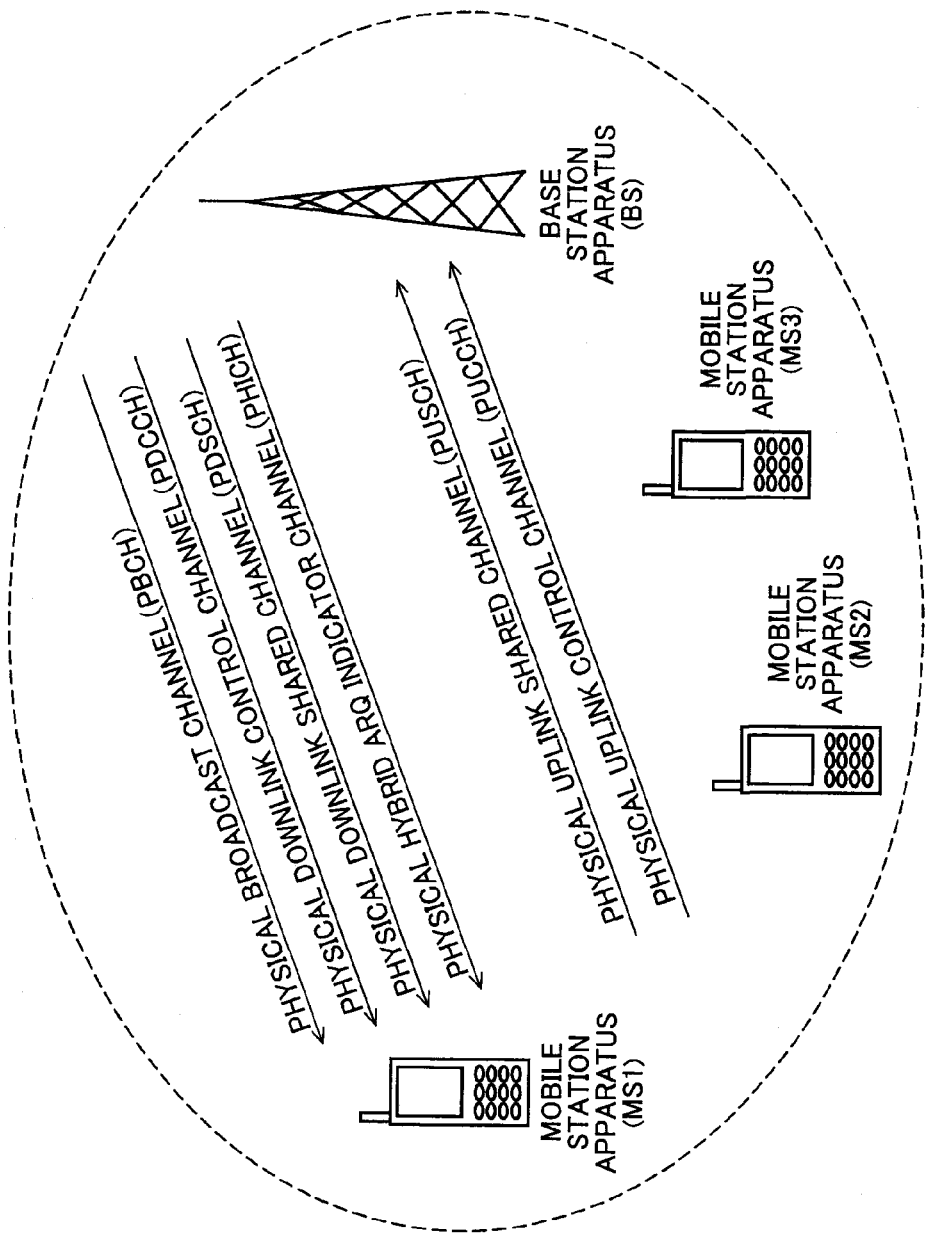
FIG. 1 is a conceptual diagram of a configuration of physical channels according to an embodiment of the present invention.

Embodiments according to the present invention will now be described with reference to the drawings. FIG. 1 is a diagram of one exemplary configuration of channels of an embodiment of the present invention. Downlink physical channels are made up of a physical broadcast channel (PBCH), a PDCCH, a PDSCH, and a physical hybrid ARQ indicator channel (PHICH). Uplink physical channels are made up of a PUSCH and a PUCCH.

The PBCH maps a broadcast channel (BCH) at intervals of 40 milliseconds. Blind detection is performed for the timing of 40 milliseconds. Therefore, explicit signaling is not performed for the presentation of the timing. A sub-frame including the PBCH can be decoded by itself (self-decodable).

The PDCCH is a channel used for notifying a mobile station apparatus of resource allocation of the PDSCH, HARQ information for downlink data, and uplink transmission permission that is resource allocation of the PUSCH. The PDDCH is made up of a plurality of CCEs, and a mobile station apparatus detects the PDCCH made up of the CCEs to receive the PDCCH from a base station apparatus. A CCE is made up of a plurality of resource element groups (REGs, also referred to as mini-CCEs) distributed in frequency and time domains. A resource element is a unit resource made up of one OFDM symbol (time component) and one sub-carrier (frequency component) and, for example, an REG is made up of four downlink resource elements consecutive in the frequency domain, except a downlink pilot channel, in the frequency domain in the same OFDM symbol. For example, one PDCCH is made up of one, two, four, and eight CCEs having the consecutive numbers identifying the CCEs (CCE index).

The PDCCH is separately coded (subjected to separate coding) for each mobile station apparatus by type. That is, a mobile station apparatus detects a plurality of PDCCHs and acquires downlink or uplink resource allocation and information indicative of the other control information. A value of CRC (cyclic redundancy check) capable of identifying the format is added to each PDCCH and a mobile station apparatus performs CRC for each set of CCEs that may make up a PDCCH and acquires a PDCCH of successful CEC. This is referred to as blind decoding and, with regard to a set of CCEs that may make up a PDCCH subjected to the blind decoding by a mobile station apparatus, the range thereof is referred to as a search space. A mobile station apparatus performs the blind decoding for CCEs in the search space to detect a PDCCH.

If resource allocation of a PDSCH is transmitted on a PDCCH, a mobile station apparatus uses the PDSCH to receive a downlink signal (data) (downlink data (a downlink shared channel (DL-SCH)), and/or downlink control data) in accordance with the resource allocation specified by using the PDCCH from a base station apparatus. That is, the PDCCH is used for transmitting a signal performing resource allocation to downlink (hereinafter referred to as "downlink transmission permission signal" or "downlink grant"). If resource allocation of a PUSCH is transmitted on a PDCCH, a mobile station apparatus uses the PUSCH to transmit an uplink signal (data) (uplink data (an uplink shared channel (UL-SCH)), and/or uplink control data) in accordance with the resource allocation specified by using the PDCCH from a base station apparatus. That is, the PDCCH is used for transmitting a signal permitting data transmission to uplink (hereinafter referred to as "uplink transmission permission signal" or "uplink grant").

The PDSCH is a channel used for transmitting the downlink data (the downlink shared channel (DL-SCH)) or paging information (a paging channel (PCH)). The downlink data (the downlink shared channel (DL-SCH)) indicates transmission of user data, for example, and the DL-SCH is a transport channel. The DL-SCH supports HARQ and dynamic adaptive radio link control. The DL-SCH supports dynamic resource allocation and quasi-static resource allocation.

The PUSCH is a channel mainly used for transmitting the uplink data (the uplink shared channel: UL-SCH). If a base station apparatus schedules a mobile station apparatus, uplink control data (control information, uplink control information) is also transmitted by using the PUSCH. This uplink control data includes channel state information (CSI) (channel state information or channel statistical information), a downlink channel quality indicator (CQI), a precoding matrix indicator PMI, a rank indicator (RI), and the HARQ control information for transmission of a downlink signal (downlink transport block). The HARQ control information for transmission of a downlink signal includes information indicative of ACK/NACK and/or information indicative of DTX for PDCCHs and/or downlink transport blocks. The DTX is information indicating that a mobile station apparatus cannot detect the PDCCH from a base station apparatus. On the PUSCH, data is transmitted to a base station apparatus after adding a 24-bit CRC code generated by using a predetermined generating polynomial from data to be transmitted through the PUSCH (uplink transport blocks).

The uplink data (UL-SCH) indicates transmission of user data, for example, and the UL-SCH is a transport channel. The UL-SCH supports HARQ and dynamic adaptive radio link control. The UL-SCH supports dynamic resource allocation and semi-static resource allocation.

The uplink data (UL-SCH) and the downlink data (DL-SCH) may include radio resource control signals exchanged between a base station apparatus and a mobile station apparatus (hereinafter referred to as "RRC signaling: Radio Resource Control Signaling"), MAC (Medium Access Control) control elements, etc. The RRC signaling indicates signals exchanged through a higher layer (ratio resource control layer) between a base station apparatus and a mobile station apparatus.

The PUCCH is a channel used for transmitting uplink control data. The uplink control data includes, for example, channel state information (CSI) (channel state information or channel statistical information), a downlink channel quality indicator (CQI), a precoding matrix indicator (PMI), and a rank indicator (RI) transmitted (fed back) from a mobile station apparatus to a base station apparatus. The uplink control data also includes a scheduling request (SR) that requests resource allocation for transmission of uplink data by a mobile station apparatus, and the HARQ control information for downlink signals (downlink transport blocks). ACK and NACK are used for HARQ process. HARQ combines automatic repeat request (ARQ) with error-correcting coding such as turbo coding to provide error control. For example, in the case of HARQ using chase combining (CC), when an error is detected in a reception packet, retransmission of the completely same packet is requested. These two reception packets are combined to improve reception quality. In the case of HARQ using incremental redundancy (IR), since redundancy bits are divided and the divided bits are sequentially retransmitted bit by bit, a coded rate is reduced as the number of times of retransmission increases, thereby ensuring enhanced error-correcting capability.

Figure 2:
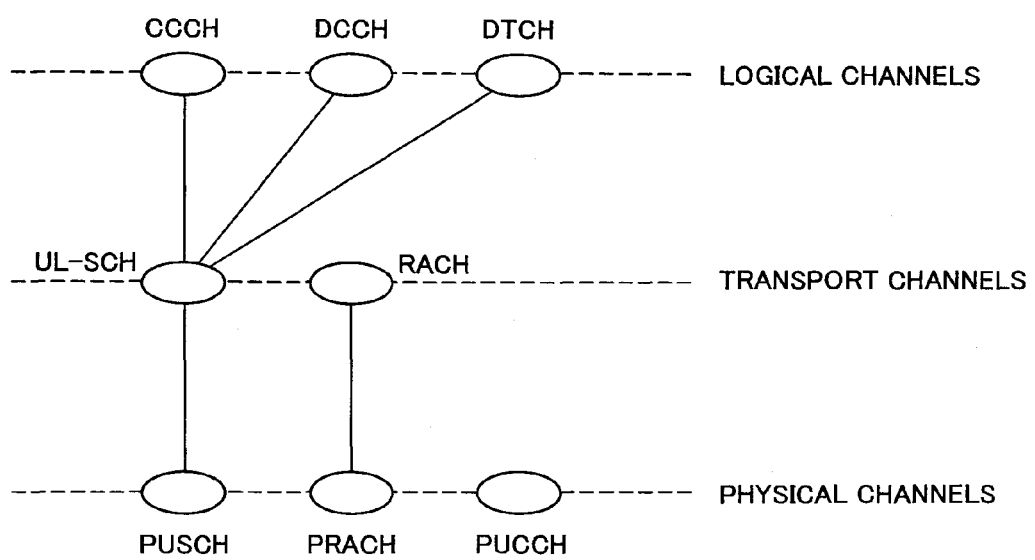
FIG. 2 is a conceptual diagram of relationship of logical channels, transport channels, and physical channels according to the embodiment of the present invention.

FIG. 2 is a diagram of one exemplary configuration of channels of the present invention. As depicted in FIG. 2, the channels of the present invention are classified into logical channels, transport channels, and physical channels. FIG. 2 depicts the uplink channels. The logical channels define types of data transmission services transmitted/received through a medium access control (MAC) layer. The transport channels define what characteristics the data transmitted through a radio interface has and how the data is transmitted. The physical channels are physical channels carrying the transport channels.

The uplink logical channels include a common control channel (CCCH), a dedicated control channel (DCCH), and a dedicated traffic channel (DTCH). The uplink transport channels include the UL-SCH and a random access channel (RACH).

The logical channels in uplink will be described. The CCCH is a channel used for transmitting control information between a mobile station apparatus and a network and is used by a mobile station apparatus not having radio resource control (RRC) connection with the network.

The DCCH is a point-to-point bidirectional channel and is a channel utilized for transmitting individual control information between a mobile station apparatus and the network. The dedicated control channel (DCCH) is used by a mobile station apparatus having the RRC connection. The DTCH is a point-to-point bidirectional channel, is a channel dedicated to one mobile station apparatus, and is utilized for transferring user information (unicast data). The random access channel (RACH) is used for transmitting limited control information.

On the other hand, as depicted in FIG. 2, the transport channels and the physical channels are mapped in uplink as follows. The UL-SCH is mapped to the PUSCH. The RACH is mapped to the physical random access channel (PRACH). The PUCCH is independently used in the physical channels. As depicted in FIG. 2, in the mapping of the logical channels and the transport channels in uplink, the CCCH, the DCCH, and the DTCH are mapped to the UL-SCH. The RACH is not mapped to a logical channel.

Figure 3:
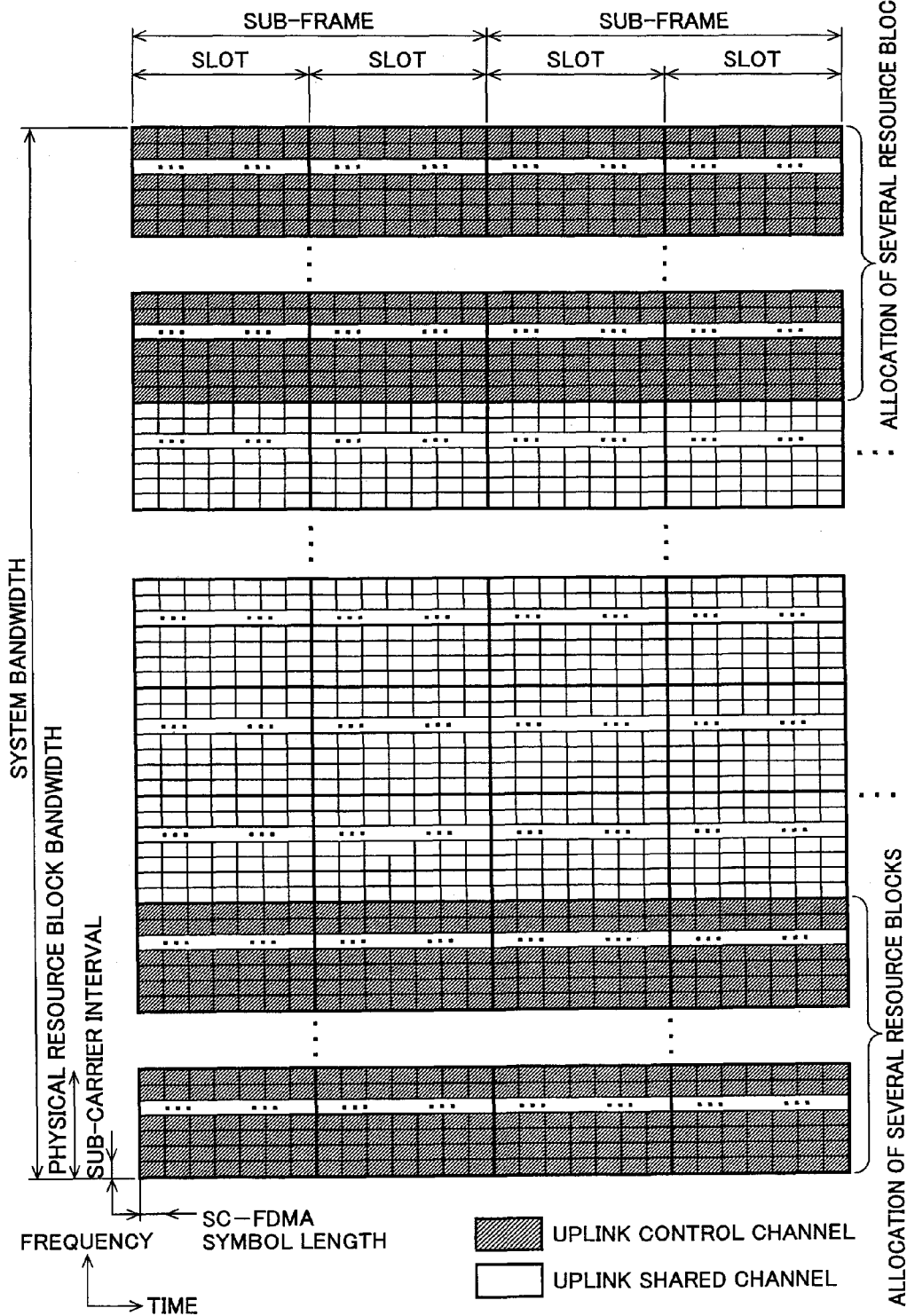
FIG. 3 is a diagram of a configuration of a physical uplink control channel and a physical uplink shared channel according to the embodiment of the present invention.

FIG. 3 is a diagram of an example of a general configuration of an uplink radio frame (uplink radio resource) in this embodiment. In FIG. 3, a horizontal axis represents the time domain and a vertical axis represents the frequency domain. The uplink radio frame is made up of a plurality of PRB pairs. Each of these PRB pairs is a unit of radio resource allocation etc., and consists of a frequency band (PRB bandwidth) of a predetermined width and a time span (two slots=one sub-frame). One PRB pair is basically made up of two consecutive PRBs (PRB bandwidth×slots). In the PUCCH, the PRB pairs are located in several resource blocks on the both ends of the system bandwidth (indicated by shaded areas in FIG. 3) and are arranged in a hopping manner for each slot so as to acquire frequency diversity. One PRB is made up of 12 sub-carriers in the frequency domain and seven SC-FDMA symbols in the time domain. The system bandwidth is the communication bandwidth of the base station apparatus and is made up of a plurality of PRBs. A slot made up of seven SC-FDMA symbols, a sub-frame made up of two slots, and a radio frame made up of 10 sub-frames are defined on the time domain. A unit made up of one sub-carrier and one SC-FDMA is referred to as a resource element. The uplink radio frame is disposed with a plurality of PRBs depending on the system bandwidth.

Each sub-frame of uplink is disposed with a PUCCH and a PUSCH, and the PUCCH and the PUSCH are disposed with uplink pilot channels used for propagation channel estimation. The PUCCH is arranged from the physical resource block PRB pairs on the both ends of the system bandwidth and the PUSCH is disposed on the remaining physical resource block PRB pairs. Although the uplink pilot channels are not depicted in FIG. 2 for simplicity of description, the uplink pilot channels are time-multiplexed with the PUCCH and the PUSCH.

In the PUCCH, for example, code spreading is performed in a frequency direction utilizing a CAZAC (Constant Amplitude and Zero Auto-Correlation) sequence having a sequence length of 12 in a frequency direction (12 subcarriers) and a time direction (for estimating a propagation channel) for one schedule unit (two resource blocks). The CAZAC sequence is a sequence having constant amplitude and excellent autocorrelation characteristics in the time and frequency domains. Because of the constant amplitude in the time domain, PAPR (Peak to Average Power Ratio) can be suppressed to a lower level. For example, in the PUCCH, multiplexing of users can be implemented by giving a cyclic shift (cyclic delay) to the CAZAC sequence having a length of 12. When the HARQ control information is transmitted, a block code enables utilization of the code spreading in the time domain and, specifically, a Walsh code having a sequence length of four can be used. As described above, when the HARQ control information is transmitted, PUCCH resources enable the user multiplexing to be implemented by using codes in the same time and frequency resources.

[Configuration of Base Station Apparatus]

Figure 4:
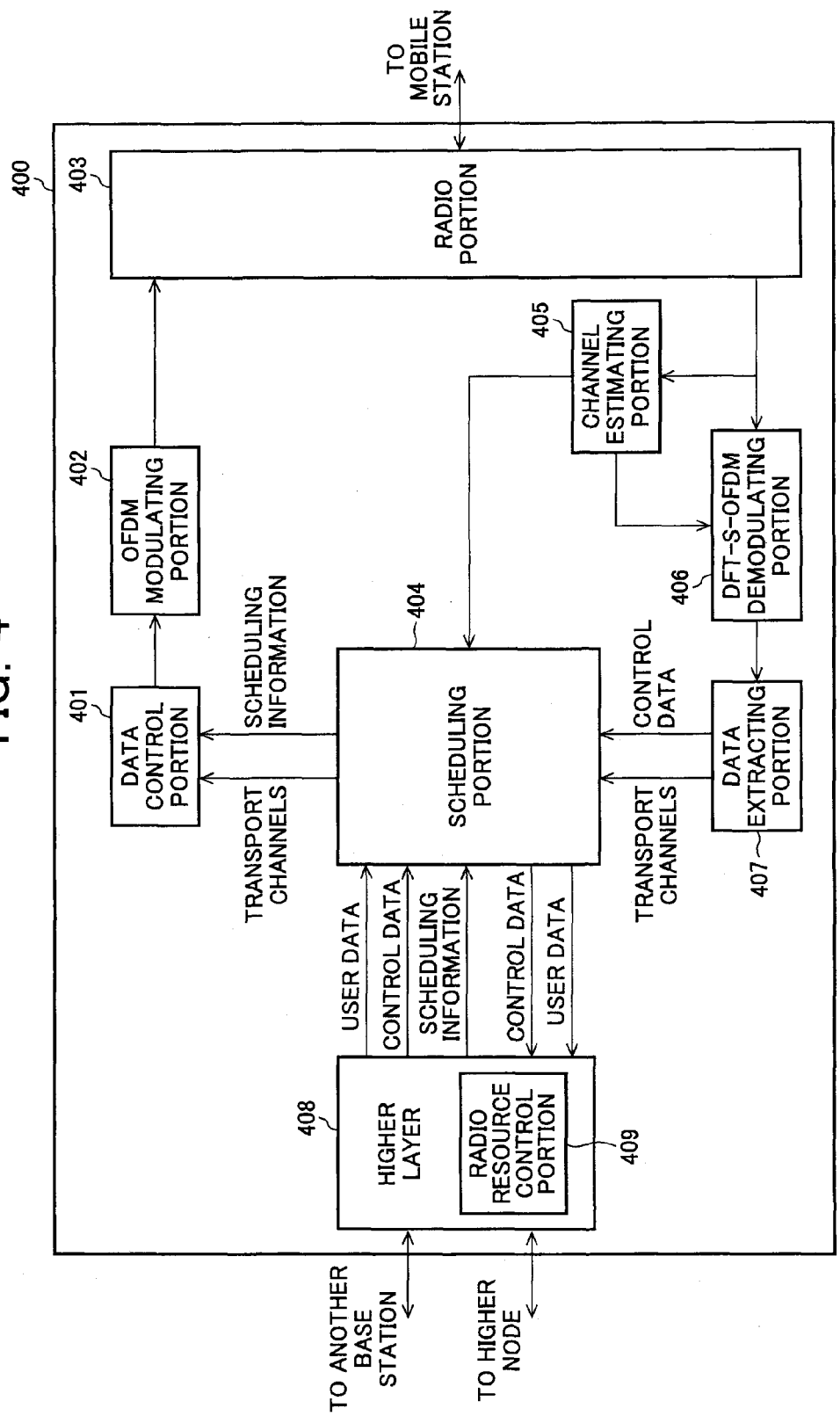
FIG. 4 is a block diagram of a general configuration of a base station apparatus according to the embodiment of the present invention.

FIG. 4 is a block diagram of a general configuration of a base station apparatus 400 according to an embodiment of the present invention. The base station apparatus 400 includes a data control portion 401, an OFDM modulating portion 402, a radio portion 403, a scheduling portion 404, a channel estimating portion 405, a DFT-Spread-OFDM (DFT-S-OFDM) demodulating portion 406, a data extracting portion 407, and a higher layer 408. A receiving portion is made up of the radio portion 403, the scheduling portion 404, the channel estimating portion 405, the DFT-Spread-OFDM (DFT-S-OFDM) demodulating portion 406, the data extracting portion 407, and the higher layer 408, and a transmitting portion is made up of the data control portion 401, the OFDM modulating portion 402, the radio portion 403, the scheduling portion 404, and the higher layer 408.

The radio portion 403, the channel estimating portion 405, the DFT-Spread-OFDM (DFT-S-OFDM) demodulating portion 406, and the data extracting portion 407 execute processing of an uplink physical layer. The radio portion 403, the OFDM modulating portion 402, and the data control portion 401 execute processing of a downlink physical layer.

The data control portion 401 receives transport channels and scheduling information from the scheduling portion 404. The data control portion 401 maps the transport channels as well as signals and channels generated in the physical layer to physical channels based on the scheduling information input from the scheduling portion 404. The data mapped as described above are output to the OFDM modulating portion 402.

The OFDM modulating portion 402 executes OFDM signal processing such as encoding, data modulation, input signal serial/parallel conversion, the IFFT (Inverse Fast Fourier Transform) processing, CP (cyclic prefix) insertion, and filtering for data input from the data control portion 401 to generate and output an OFDM signal to the radio portion 403 based on the scheduling information from the scheduling portion 404 (including downlink physical resource block PRB allocation information (e.g., physical resource block position information such as frequency and time), and a modulation scheme and a coding scheme corresponding to each PRB (e.g., 16QAM modulation, ⅔ coding rate)).

The radio portion 403 up-converts the modulated data input from the OFDM modulating portion 402 to a radio frequency to generate and transmit a radio signal via an antenna (not depicted) to a mobile station apparatus 500. The radio portion 403 receives an uplink radio signal from the mobile station apparatus 500 via the antenna (not depicted) and down-converts the signal to a baseband signal to output reception data to the channel estimating portion 405 and the DFT-S-OFDM demodulating portion 406.

The scheduling portion 404 executes processing of a medium access control (MAC) layer. The scheduling portion 404 performs the mapping of logical channels and transport channels, the scheduling of downlink and uplink (such as HARQ processing and selection of transport format), etc.

In the downlink scheduling, the scheduling portion 404 executes a selection processing of a downlink transport format (transmission form) for modulating data (such as allocation of physical resource blocks and a modulating scheme and a coding scheme) and provides retransmission control of HARQ, based on uplink feedback information received from the mobile station apparatus 500 (such as downlink channel feedback information (channel state information (channel quality, the number of streams, and precoding information)) and ACK/NACK feedback information for downlink data), information of usable PRBs of mobile station apparatuses, a buffer status, the scheduling information input from the higher layer 408, etc. The scheduling information used for the downlink scheduling is output to the data control portion 401.

In the uplink scheduling, the scheduling portion 404 executes a selection processing of an uplink transport format (transmission form) for modulating data (such as allocation of physical resource blocks and a modulating scheme and a coding scheme) based on an estimation result of an uplink channel state (radio propagation channel state) output by the channel estimating portion 405, a resource allocation request from the mobile station apparatus 500, information of usable PRBs of the mobile station apparatuses 500, the scheduling information input from the higher layer 408, etc. The scheduling information used for the uplink scheduling is output to the data control portion 401.

The scheduling portion 404 maps the downlink logical channels input from the higher layer 408 to the transport channels before output to the data control portion 401. The scheduling portion 404 processes the control data acquired through uplink and the transport channels input from the data extracting portion 407 as needed and maps the control data and the transport channels to the uplink logical channels before output to the higher layer 408.

The channel estimating portion 405 estimates an uplink channel state from an uplink demodulation reference signal (DRS) for the demodulation of uplink data and outputs the estimation result to the DFT-S-OFDM demodulating portion 406. The channel estimating portion 405 also estimates an uplink channel state from an uplink sounding reference signal (SRS) for scheduling the uplink and outputs the estimation result to the scheduling portion 404. Although it is assumed that the uplink communication system is a single carrier system such as DFT-S-OFDM, a multicarrier system such as OFDM may be used.

Based on the uplink channel state estimation result input from the channel estimating portion 405, the DFT-S-OFDM demodulating portion 406 executes DFT-S-OFDM signal processing such as DFT transform, sub-carrier mapping, IFFT transform, and filtering for the modulated data input from the radio portion 403 to execute the demodulating processing before output to the data extracting portion 407. If spreading using codes is performed by the mobile station apparatus, the sequence utilized for the spreading is referenced from the scheduling portion 404 and de-spreading is performed based on the sequence.

The data extracting portion 407 confirms the correctness of the data input from the DFT-S-OFDM demodulating portion 406 and outputs the confirmation result (acknowledgement signal ACK/negative acknowledgement signal NACK) to the scheduling portion 404. The data extracting portion 407 divides the data input from the DFT-S-OFDM demodulating portion 406 into the transport channels and the control data of the physical layer, which are output to the scheduling portion 404. The divided control data includes uplink feedback information supplied from the mobile station apparatus 500 (a downlink channel feedback report CFR, ACK/NACK feedback information for downlink data).

The higher layer 408 executes processing of a radio resource control (RRC) layer. The higher layer 408 has a radio resource control portion 409 (also referred to as a control portion). The radio resource control portion 409 performs management of various pieces of configuration information, management of system information, management of communication states of mobile station apparatuses, management of migration such as handover, management of buffer status of each mobile station apparatus, etc.

[Configuration of Mobile Station Apparatus]

Figure 5:
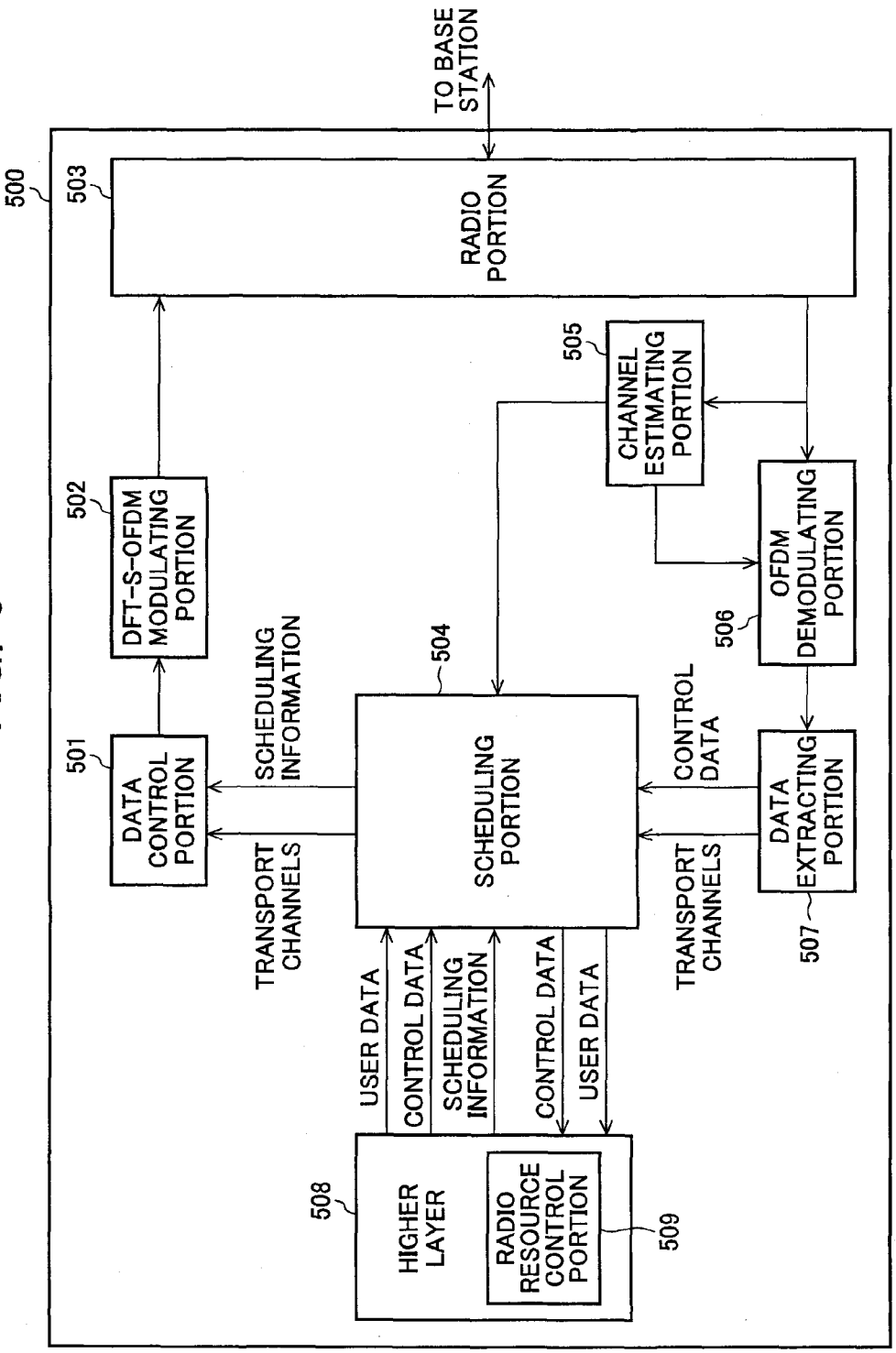
FIG. 5 is a block diagram of a general configuration of a mobile station apparatus according to the embodiment of the present invention.

FIG. 5 is a block diagram of a general configuration of the mobile station apparatus 500 according to the embodiment of the present invention. The mobile station apparatus 500 includes a data control portion 501, a DFT-S-OFDM modulating portion 502, a radio portion 503, a scheduling portion 504, a channel estimating portion 505, an OFDM demodulating portion 506, a data extracting portion 507, and a higher layer 508. A transmitting portion is made up of the data control portion 501, the DFT-S-OFDM modulating portion 502, the radio portion 503, the scheduling portion 504, and the higher layer 508, and a receiving portion is made up of the radio portion 503, the scheduling portion 504, the channel estimating portion 505, the OFDM demodulating portion 506, the data extracting portion 507, and the higher layer 508.

The data control portion 501, the DFT-S-OFDM modulating portion 502, and the radio portion 503 execute processing of the uplink physical layer. The radio portion 503, the channel estimating portion 505, the OFDM demodulating portion 506, and the data extracting portion 507 execute processing of the downlink physical layer.

The data control portion 501 receives transport channels and scheduling information from the scheduling portion 504. The data control portion 501 maps the transport channels as well as signals and channels generated in the physical layer to the physical channels based on the scheduling information input from the scheduling portion 504. The data mapped as described above are output to the DFT-S-OFDM modulating portion 502.

The DFT-S-OFDM modulating portion 502 executes DFT-S-OFDM signal processing such as data modulation, DFT (Discrete Fourier Transform) processing, sub-carrier mapping, IFFT (Inverse Fast Fourier Transform) processing, CP insertion, and filtering for the data input from the data control portion 501 to generate and output a DFT-S-OFDM signal to the radio portion 503. Although it is assumed that the uplink communication system is a single carrier system such as DFT-S-OFDM, a multicarrier system such as OFDM may be used instead. If codes for spreading are supplied from the base station apparatus, the codes may be utilized for spreading to generate a transmission signal.

The radio portion 503 up-converts the modulated data input from the DFT-S-OFDM modulating portion 502 to a radio frequency to generate and transmit a radio signal via an antenna (not depicted) to the base station apparatus 400. The radio portion 503 receives a radio signal modulated with the downlink data from the base station apparatus 400 via the antenna (not depicted) and down-converts the signal to a baseband signal to output the reception data to the channel estimating portion 505 and the OFDM demodulating portion 506.

The scheduling portion 504 executes processing of a medium access control (MAC) layer. The scheduling portion 504 performs the mapping of logical channels and transport channels, the scheduling of downlink and uplink (such as HARQ process and selection of transport format), etc. In the down link scheduling, the scheduling portion 504 provides the reception control of the transport channels as well as the physical signals and physical channels, and the HARQ retransmission control, based on the scheduling information from the base station apparatus 400 and the higher layer 508 (the transport format and the HARQ retransmission information).

In the uplink scheduling, the scheduling portion 504 executes a scheduling processing for mapping the uplink logical channels input from the higher layer 508 to the transport channels based on an uplink buffer status input from the higher layer 508, the uplink scheduling information from the base station apparatus 400 input from the data extracting portion 507 (the transport format and the HARQ retransmission information), and the scheduling information input from the higher layer 508. For the uplink transport format, the information supplied from the base station apparatus 400 is utilized. The scheduling information is output to the data control portion 501.

The scheduling portion 504 maps the uplink logical channels input from the higher layer 508 to the transport channels before output to the data control portion 501. The scheduling portion 504 also outputs to the data control portion 501 the downlink channel feedback report CFR (channel state information) input from the channel estimating portion 505 and a CRC confirmation result input from the data extracting portion 507. The scheduling portion 504 processes the control data acquired through downlink and the transport channels input from the data extracting portion 507 as needed and maps the control data and the transport channels to the downlink logical channels before output to the higher layer 508.

The channel estimating portion 505 estimates a downlink channel state from a downlink reference signal (RS) for the demodulation of downlink data and outputs the estimation result to the OFDM demodulating portion 506. The channel estimating portion 505 estimates a downlink channel state from a downlink reference signal (RS) for notifying the base station apparatus 400 of an estimation result of a downlink channel state (radio propagation channel state) and converts this estimation result into downlink channel state feedback information (such as channel quality information), which is output to the scheduling portion 504.

The OFDM demodulating portion 506 executes the OFDM demodulation processing for the modulated data input from the radio portion 503 based on the downlink channel state estimation result input from the channel estimating portion 505 and outputs the data to the data extracting portion 507.

The data extracting portion 507 performs CRC for the data input from the OFDM demodulating portion 506 to confirm the correctness and outputs the confirmation result (ACK/NACK feedback information) to the scheduling portion 504. The data extracting portion 507 divides the data input from the OFDM demodulating portion 506 into the transport channels and the control data of the physical layer, which are output to the scheduling portion 504. The divided control data includes the scheduling information such as downlink or uplink resource allocation and uplink HARQ control information.

The higher layer 508 has a radio resource control portion 509. The radio resource control portion 509 performs management of various pieces of configuration information, management of system information, management of communication state of the mobile station, and management of handover etc.

(First Embodiment)

A first embodiment of a mobile communication system using the base station apparatus and the mobile station apparatus will be described.

In the first embodiment, the base station apparatus allocates a PUSCH resource for transmission of the HARQ control information by the mobile station apparatus, and the mobile station apparatus uses the PUSCH resource to transmit the HARQ control information to the base station apparatus.

The base station apparatus allocates a PUCCH resource for transmission of the HARQ control information for a plurality of downlink component carriers by the mobile station apparatus, and the mobile station apparatus uses the PUCCH resource to transmit the HARQ control information to the base station apparatus.

Although a frequency band is defined in bandwidth (Hz) in the first embodiment, a frequency band may be defined in the number of resource blocks (RBs) made up of frequency and time. Component carriers (hereinafter also referred to as "carrier components", "element carriers", or "carrier elements") in this embodiment are (narrower) frequency bands aggregated when the base station apparatus and the mobile station apparatus perform communication by using a wider frequency band (or a system band). The base station apparatus and the mobile station apparatus can aggregate a plurality of component carriers to make up a wider frequency band and use the plurality of component carriers in a composite manner, thereby realizing high-speed data communication (transmission/reception of information) (frequency band aggregation described above). For example, the base station apparatus and the mobile station apparatus can aggregate five component carriers having a bandwidth of 20 MHz to make up a wider frequency band having a bandwidth of 100 MHz and use these five component carriers in a composite manner to perform communication.

A component carrier indicates each of the (narrower) frequency bands (e.g., the frequency bands having a bandwidth of 20 MHz) making up this wider frequency band (e.g., the frequency band having a bandwidth of 100 MHz). A component carrier also indicates a (center) carrier frequency of each of the (narrower) frequency bands making up this wider frequency band. That is, a downlink component carrier has a band (width) of a portion of the frequency band usable by the base station apparatus and the mobile station apparatus at the time of transmission/reception of a downlink signal, and an uplink component carrier has a band (width) of a portion of the frequency band usable by the base station apparatus and the mobile station apparatus at the time of transmission/reception of an uplink signal. A component carrier may be defined as a constituent unit of a certain physical channel (e.g., a PDCCH, a PDSCH, a PUCCH, and a PUSCH).

Component carriers may be arranged in continuous frequency bands or may be arranged in non-continuous frequency bands, and a wider frequency band is established by aggregating a plurality of component carriers that are continuous and/or non-continuous frequency bands. A frequency band (or a downlink system band or a downlink system bandwidth) used for downlink communication made up of downlink component carriers may not necessarily have the same bandwidth as a frequency band (or an uplink system band or an uplink system bandwidth) used for uplink communication made up of uplink component carriers. Even if the frequency band used for downlink communication and the frequency band used for uplink communication have bandwidths different from each other, the base station apparatus and the mobile station apparatus can use the component carriers in a composite manner to perform communication (asymmetric frequency band aggregation described above).

Figure 6:
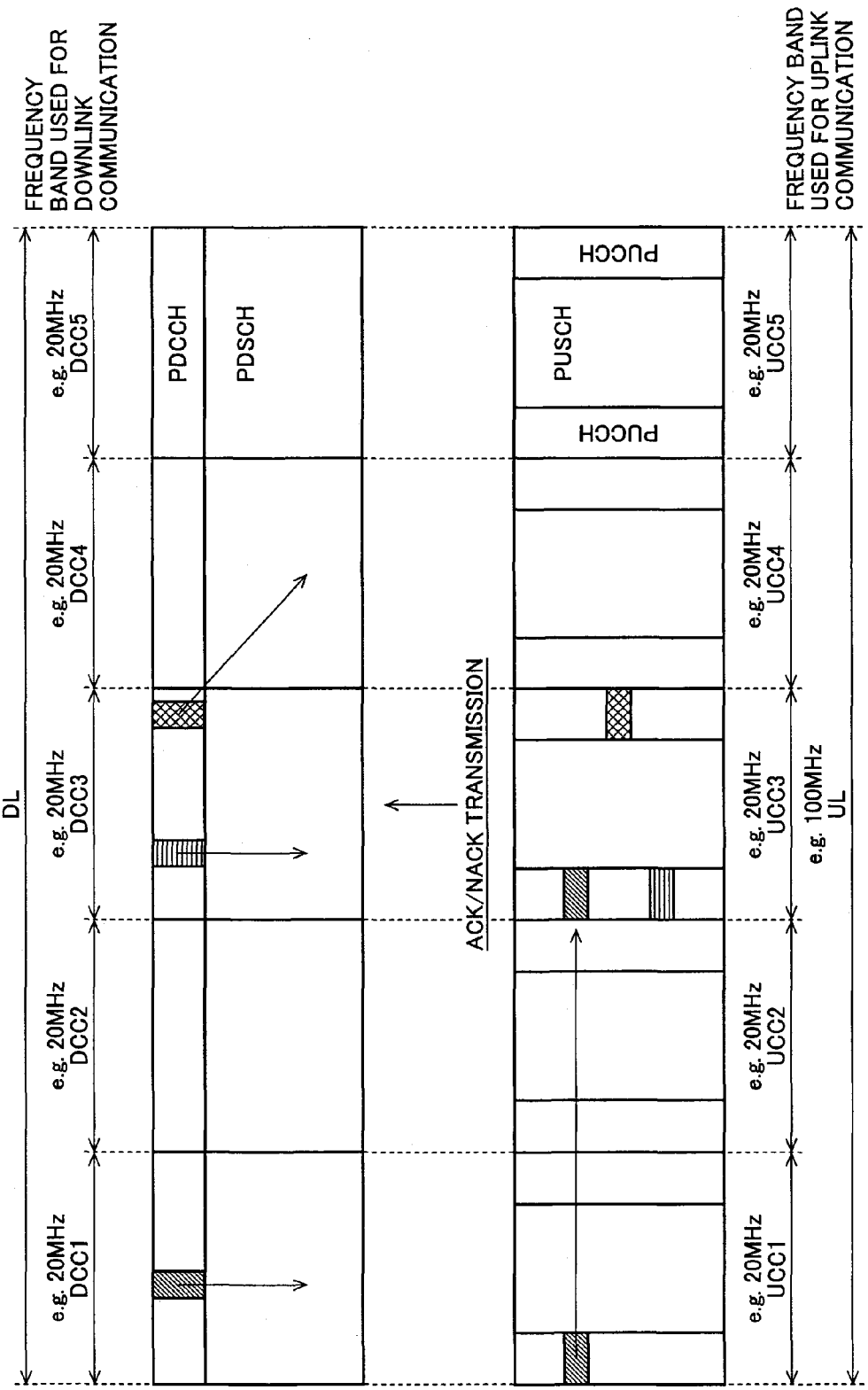
FIG. 6 is a diagram of an exemplary configuration of downlink and uplink component carriers according to the embodiment of the present invention.

FIG. 6 depicts an example of a mobile communication system to which the first embodiment is applicable. FIG. 6 depicts that a frequency band used for downlink communication having a bandwidth of 100 MHz is made up of five downlink component carriers (DCC1, DCC2, DCC3, DCC4, and DCC5) each having a bandwidth of 20 MHz, and that a frequency band used for uplink communication having a bandwidth of 100 MHz is made up of five uplink component carriers (UCC1, UCC2, UCC3, UCC4, and UCC5) each having a bandwidth of 20 MHz. In FIG. 6, downlink/uplink channels are mapped on each of the downlink/uplink component carriers. In FIG. 6, any of downlink/uplink channels such as a PDCCH, a PDSCH, a PUCCH, and a PUSCH may not be mapped on some downlink/uplink component carriers.

In FIG. 6, the base station apparatus can use a PDCCH mapped on a downlink component carrier to allocate a PDSCH. In FIG. 6, by way of example, it is depicted that the base station apparatus uses a PDCCH mapped on DCC1 (a PDCCH indicated by diagonal lines) to allocate a PDSCH mapped on DCC1 (the PDSCH mapped on DCC1 is allocated by the PDCCH indicated by diagonal lines in DCC1).

In FIG. 6, the base station apparatus can use a plurality of PDCCHs mapped on one downlink component carrier to allocate a plurality of PDSCHs in the same sub-frame. For example, the base station apparatus transmits to the mobile station apparatus each of a plurality of PDCCHs mapped on one downlink component carrier with the inclusion of information representative of a component carrier indicator. The base station apparatus transmits a PDCCH indicated by diagonal lines in DCC3 to the mobile station apparatus with the inclusion of information representative of a component carrier indicator indicating that a PDSCH on DCC4 is allocated. In this case, the base station apparatus may transmit a PDCCH indicated by diagonal lines in DCC1 to the mobile station apparatus with the inclusion of information representative of a component carrier indicator indicating that a PDSCH on DCC1 is allocated.

By way of example, FIG. 6 depicts that the base station apparatus uses two PDCCHs mapped on DCC3 (PDCCHs respectively indicated by grid lines and mesh lines) to indicate that PDSCHs mapped on DCC3 and DCC4 are allocated (the PDSCH mapped on DCC3 is allocated by the PDCCH indicated by grid lines in DCC3, and the PDSCH mapped on DCC4 is allocated by the PDCCH indicated by grid lines in DCC3). The base station apparatus can use the PDSCHs mapped on DCC1, DCC3, and DCC4 to transmit (up to three) downlink transport blocks to the mobile station apparatus in the same sub-frame.

In FIG. 6, the mobile station apparatus use respective PUSCHs on uplink component carriers to transmit a plurality of uplink transport blocks to the base station apparatus in the same sub-frame. For example, the mobile station apparatus uses five PUSCHs on UCC1, UCC2, UCC3, UCC4, and UCC5 to transmit (up to five) uplink transport blocks to the base station apparatus in the same sub-frame.

In FIG. 6, the mobile station apparatus transmits to the base station apparatus the HARQ control information for PDCCH(s) and/or downlink transport block(s) transmitted from the base station apparatus. For example, the mobile station apparatus transmits to the base station apparatus the HARQ control information for five PDCCHs and/or five downlink transport blocks transmitted in the same sub-frame from the base station apparatus.

In FIG. 6, the base station apparatus allocates to the mobile station apparatus a PUCCH resource for transmission of the HARQ control information by the mobile station apparatus. For example, the base station apparatus can allocate a PUCCH resource for transmission of the HARQ control information by the mobile station apparatus for each of PDSCHs transmitted on respective downlink component carriers. Specifically, the base station apparatus can allocate the PUCCH resource for transmission of the HARQ control information by the mobile station apparatus in correlation with a PDCCH allocating a PDSCH transmitted on each downlink component carrier.

For example, the base station apparatus can use the RRC signaling to allocate the PUCCH resource for transmission of the HARQ control information by the mobile station apparatus.

When the base station apparatus allocates a PUCCH resource to the mobile station apparatus for each PDSCH (in correlation with a PDCCH allocating a PDSCH), this is referred to as dynamic allocation of PUCCH resource. The dynamic allocation of PUCCH resource by the base station apparatus means that, for example, the base station apparatus allocates a PUCCH resource to the mobile station apparatus every millisecond.

When the base station apparatus uses the RRC signaling to allocate a PUCCH resource to the mobile station apparatus, this is referred to as semi-static allocation of PUCCH resource. The semi-static allocation of PUCCH resource by the base station apparatus means that, for example, the base station apparatus allocates a PUCCH resource to the mobile station apparatus at intervals on the order of 100 ms. The mobile station apparatus with a PUCCH resource allocated semi-statically by the base station apparatus retains the allocated PUCCH resource on a long-term (permanent) basis and uses the PUCCH resource to transmit the HARQ control information to the base station apparatus at the timing that the HARQ control information should be transmitted (In case of transmission of the HARQ control information is required), for example.

The base station apparatus sets correlations between downlink component carriers and uplink component carriers in a cell-specific manner with broadcast information broadcasted by each downlink component carrier (by using a broad cast channel (PBCH)). The base station apparatus sets correlations between downlink component carriers and uplink component carriers in a mobile-station-apparatus-specific manner with the RRC signaling transmitted to each mobile station apparatus. The base station apparatus also uses the broadcast channel or the RRC signaling to set an uplink component carrier for transmission of the HARQ control information by the mobile station apparatus in a cell-specific or mobile-station-apparatus-specific manner.

The base station apparatus allocates (ensures) a resource of a PUCCH (PUCCH resource area) for transmission of the HARQ control information by the mobile station apparatus with the broadcast information broadcasted (by using the broad cast channel (PBCH)). The base station apparatus allocates (ensures) a resource of a PUCCH (PUCCH resource area) for transmission of the HARQ control information by the mobile station apparatus with the RRC signaling transmitted for each mobile station apparatus.

As described above, the base station apparatus allocates the PUCCH resource for transmission of the HARQ control information by the mobile station apparatus in correlation with a PDCCH allocating a PDSCH transmitted through each downlink component carrier. Specifically, the base station apparatus uses a position of a PDCCH in a PDCCH resource (PDCCH resource area) mapped on a downlink component carrier to specify in which area in the PUCCH resource area the mobile station apparatus maps the HARQ control information for transmission (which area in the PUCCH resource area is used for transmitting the HARQ control information). In other words, the mobile station apparatus maps and transmits to the base station apparatus the HARQ control information on the PUCCH (in the PUCCH resource area) set with the broadcast channel or the RRC signaling depending on how a PDCCH mapped on a downlink component carrier is mapped on a PDCCH resource (PDCCH resource area). The correlation between a PDCCH mapped on a downlink component carrier and each PUCCH is defined, for example, by correlating a CCE index at the head of CCEs making up each PDCCH with an index of each PUCCH resource.

By way of example, FIG. 6 depicts that the first CCE index of CCEs making up the PDCCH indicated by diagonal lines correlates with the index of the PUCCH resource indicated by diagonal lines surrounded by a solid line, that the first CCE index of CCEs making up the PDCCH indicated by grid lines correlates with the index of the PUCCH indicated by grid lines, and that the first CCE index of CCEs making up the PDCCH indicated by mesh lines correlates with the index of the PUCCH indicated by mesh lines.

Specifically, in FIG. 6, by way of example, it is depicted that the base station apparatus uses the broadcast channel or the RRC signaling to correlate the downlink component carrier (DCC1) on which PDCCH is mapped with the uplink component carrier (UCC1). It is also depicted that the base station apparatus uses the broadcast channel or the RRC signaling to correlate the downlink component carrier (DCC3) on which PDCCH is mapped with the uplink component carrier (UCC3).

The mobile station apparatus may transmit the HARQ control information through any one uplink component carrier. For example, an area of PUCCH resource settable in one uplink component carrier is allocated (ensured) by the base station apparatus such that the mobile station apparatus can transmit the HARQ control information on a PUCCH resource in one uplink component carrier, and the mobile station apparatus can transmit the HARQ control information to the base station apparatus by using the PUCCH resource in the area.

In FIG. 6, an arrow from the PUCCH resource indicated by diagonal lines surrounded by a solid line in UCC1 to the PUCCH resource indicated by diagonal lines surrounded by a dotted line in UCC3 represents that the base station apparatus uses the broadcast channel or the RRC signaling to allocate (ensure) a PUCCH resource (PUCCH resource area) settable on UCC3 for transmission of the HARQ control information by the mobile station apparatus.

In FIG. 6, the base station apparatus allocates a PUSCH resource for transmission of the HARQ control information by the mobile station apparatus. For example, the base station apparatus uses the RRC signaling to semi-statically allocate a PUSCH resource for transmission of the HARQ control information by the mobile station apparatus.

For example, the base station apparatus may use the RRC signaling to set a PUSCH resource (or a plurality of PUSCH resources) for transmission of the HARQ control information by the mobile station apparatus and may use a PDCCH to specify a PUSCH resource. Therefore, the base station apparatus can allocate PUSCH resources by using the RRC signaling to set the PUSCH resource to the mobile station apparatus and by using a PDCCH to specify a PUSCH resource. The PDCCH transmitted from the base station apparatus is a signal for performing resource allocation for downlink (also referred to as "downlink transmission permission signal", PDCCH allocating a PDSCH resource). For example, the base station apparatus may use the RRC signaling to set four PUSCH resources to the mobile station apparatus and may use a PDCCH to specify which PUSCH resource is used out of the four PUSCH resources to transmit the HARQ control information.

In this case, the base station apparatus can use information (an information field) transmitted on the PDCCH to (directly) specify the PUSCH resource used at the time of transmission of the HARQ control information by the mobile station apparatus out of the PUSCH resources set with the RRC signaling. The base station apparatus can (implicitly) specify, in correlation with the PDCCH, the PUSCH resource used at the time of transmission of the HARQ control information by the mobile station apparatus out of the PUSCH resources set with the RRC signaling. For example, the base station apparatus can correlate a CCE index of PDCCH with a PUSCH resource index to specify the PUSCH resource. In other words, the base station apparatus can allocate a PUSCH resource to the mobile station apparatus in correlation with a position of PDCCH transmitted to the mobile station apparatus in a PDCCH resource.

In other words, the base station apparatus semi-statically sets PUSCH resources to the mobile station apparatus and dynamically specify a PUSCH resource to allocate the PUSCH resource. In case that the base station apparatus uses the RRC signaling to set PUSCH resources and uses a PDCCH to specify a PUSCH resource, the allocation of PUSCH resources can flexibly be performed depending on a status of a propagation channel.

The mobile station apparatus uses the PUSCH resource allocated by the base station apparatus to transmit the HARQ control information. Specifically, the mobile station apparatus can use the PUSCH resource to transmit to the base station apparatus the HARQ control information for PDCCHs and/or downlink transport blocks mapped on each of a plurality of downlink component carriers. In other words, in case of receiving PDCCHs and/or PDSCHs from the base station apparatus, the mobile station apparatus can use the PUSCH resource to transmit the HARQ control information to the base station apparatus.

As described above, if the PDCCH from the base station apparatus ("uplink transmission permission signal") is used for PUSCH resource allocation for transmitting uplink data (UL-SCH), the mobile station apparatus uses the PUSCH resource to transmit the uplink data (UL-SCH) and/or uplink control data to the base station apparatus.

In case that the mobile station apparatus has the PUSCH resources (semi-statically) allocated through the RRC signaling from the base station apparatus, the mobile station apparatus transmits to the base station apparatus the HARQ control information for a plurality of PDCCHs and/or a plurality of downlink transport blocks transmitted in the same sub-frame.

In case that the mobile station apparatus has the PUSCH resources (semi-statically) allocated by the base station apparatus and has the PUSCH resource specified by the PDCCH ("downlink transmission permission signal"), the mobile station apparatus transmits to the base station apparatus the HARQ control information for a plurality of PDCCHs and/or a plurality of downlink transport blocks transmitted in the same sub-frame.

In other words, the PUSCH resources allocated through the RRC signaling or the PDCCH ("downlink transmission permission signal") from the base station apparatus are PUSCH resources for transmitting the HARQ control information by the mobile station apparatus.

Figure 7:
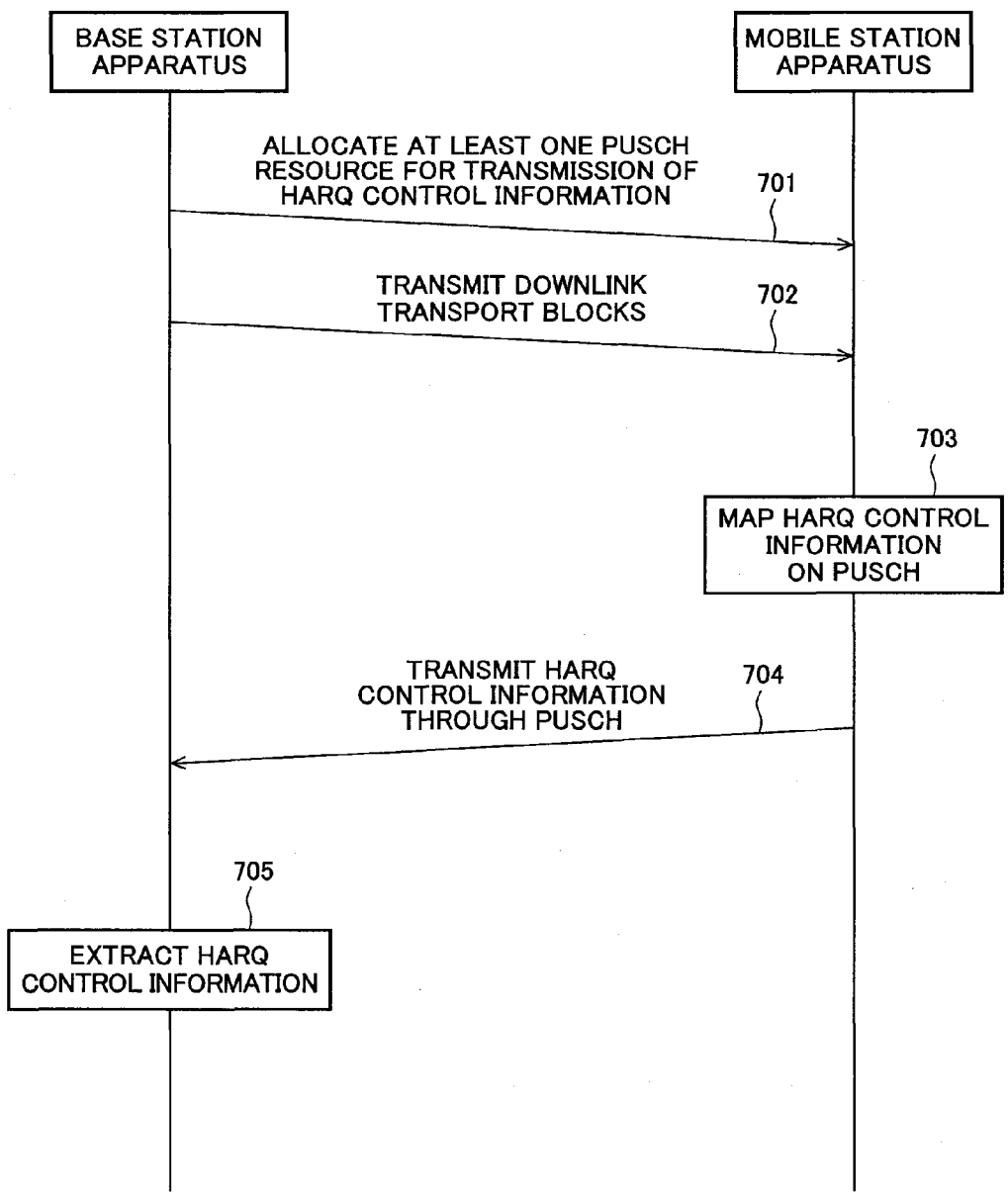
FIG. 7 is a diagram of a sequence chart to which a first embodiment, a second embodiment, and a third embodiment are applicable.

FIG. 7 is a diagram of a sequence chart when the base station apparatus and the mobile station apparatus transmit/receive the HARQ control information. First, the base station apparatus allocates at least one PUSCH resource for transmission of the HARQ control information by the mobile station apparatus (701). For example, the base station apparatus may use the RRC signaling (signal in a higher layer) to allocate to the mobile station apparatus the PUSCH resources for transmission of the HARQ control information by the mobile station apparatus. Although it is described that the base station apparatus uses the RRC signaling to allocate the PUSCH resources for transmission of the HARQ control information by the mobile station apparatus in FIG. 7, the base station apparatus may use the RRC signaling to set the PUSCH resources to the mobile station apparatus and may use a PDCCH to specify a PUSCH resource as described above.

Although the base station apparatus allocates the PUSCH resources for transmission of the HARQ control information by the mobile station apparatus in FIG. 7, the base station apparatus may allocate the PUCCH resources for transmission of the HARQ control information by the mobile station apparatus.

The base station apparatus then uses PDSCHs to transmit downlink transport blocks to the mobile station apparatus (702). For example, the base station apparatus uses a plurality of PDSCHs in respective downlink component carriers to transmit a plurality of downlink transport blocks in the same sub-frame to the mobile station apparatus. In FIG. 7, by way of example, it is assumed that the base station apparatus is set to use five downlink component carriers for communication with the mobile station apparatus and transmits one PDSCH from each of the downlink component carriers (i.e., five PDSCHs).

In case of receiving the downlink transport blocks by using the PDSCHs from the base station apparatus, the mobile station apparatus generates the HARQ control information based on the reception state of the PDSCHs (downlink transport blocks) and maps the HARQ control information on the PUSCH (703). In FIG. 7, by way of example, it is described that the mobile station apparatus maps the HARQ control information on the PUSCH; however, if the base station apparatus allocates a PUCCH, the mobile station apparatus maps the HARQ control information on the PUCCH.

To improve signal quality, an error-correcting code may be added to the HARQ control information. Alternatively, a plurality of pieces of the same HARQ control information may be mapped. To further improve signal quality, after an error-correcting code is added to the HARQ control information, a plurality of pieces of the same HARQ control information with the error-correcting code added may be mapped.

After mapping the HARQ control information on the PUSCH, the mobile station apparatus transmits the HARQ control information to the base station apparatus (704). The HARQ control information transmitted in this case may have an error-correcting code added and may include a plurality of pieces of the same HARQ control information.

In case of receiving the HARQ control information mapped on the PUSCH from the mobile station apparatus, the base station apparatus extracts (detects) the HARQ control information (705). In case that the HARQ control information is extracted, if an error-correcting code is added, decoding is performed in accordance with the coding scheme thereof. If a plurality of pieces of the same HARQ control information is mapped, the HARQ control information is extracted in accordance with the mapping thereof.

As described above, in case that the HARQ control information is transmitted/received by the base station apparatus and the mobile station apparatus performing communication by using a wide frequency band made up of a plurality of component carriers, since the mobile station apparatus uses the PUSCH resource or the PUCCH resource allocated by the base station apparatus to transmit the HARQ control information, the HARQ control information can be explicitly transmitted, thereby preventing unnecessary retransmission of the HARQ control information. With regard to the unnecessary retransmission of the HARQ control information, for example, in case that the HARQ control information includes ACK, NACK, and DTX and a mobile station apparatus transmits NACK and DTX using the same bit, if NACK transmitted by the mobile station apparatus is regarded as DTX and causes a retransmission processing in the base station apparatus, a downlink signal is transmitted again at the same modulation level etc., and, for example, if the propagation channel utilized for transmission of the downlink signal has such propagation channel characteristics that cause NACK, the mobile station apparatus cannot receive the downlink signal and transmits NACK to the base station apparatus, resulting in NACK and DTX transmitted using the same bit in this case as well. Therefore, the unnecessary processing is repeated between the base station apparatus and the mobile station apparatus. On the other hand, in case that the mobile station apparatus transmits NACK and DTX using the same bit as DTX, if this is regarded as transmission of NACK and causes a retransmission processing in the base station apparatus, the transmission is performed with MCS lower than the previous transmission and the throughput is reduced from the normally achievable level. Therefore, the unnecessary processing is executed between the base station apparatus and the mobile station apparatus. However, for example, the explicit notification of NACK and DTX as in this embodiment can prevent the unnecessary retransmission described above.

(Second Embodiment)

A second embodiment of the present invention will next be described. In the second embodiment, the base station apparatus allocates a PUSCH resource for transmission of the HARQ control information by the mobile station apparatus, and the mobile station apparatus uses the PUSCH resource to transmit the HARQ control information to the base station apparatus.

The base station apparatus allocates a PUCCH resource for transmission of the HARQ control information for a plurality of downlink component carriers by the mobile station apparatus, and the mobile station apparatus uses the PUCCH resource to transmit the HARQ control information to the base station apparatus.

The HARQ control information transmitted by the mobile station apparatus includes information indicative of ACK/NACK and information indicative of DTX. In the HARQ control information transmitted by the mobile station apparatus, the number of bits of information indicative of DTX is the same as that of downlink component carriers set by the base station apparatus.

The example of the mobile communication system depicted in FIG. 6 is also applicable to the second embodiment. The sequence chart of transmission/reception of the HARQ control information by the base station apparatus and the mobile station apparatus depicted in FIG. 7 is also applicable.

In the second embodiment, in case of mapping the HARQ control information (hereinafter also simply referred to as ACK/NACK, DTX) on a PUSCH resource or a PUCCH resource allocated by the base station apparatus, the mobile station apparatus sets ACK/NACK and DTX distinctively from each other. For example, in case of transmitting ACK/NACK and DTX, the mobile station apparatus sets these pieces of information in information fields different from each other for transmission to the base station apparatus (sets the information indicative of ACK/NACK in an information field and the information indicative of DTX in another information field different from the information field for transmission to the base station apparatus).

Although the second embodiment will hereinafter be described as the case of the base station apparatus set to use five downlink component carriers for communication with the mobile station apparatus by way of example, the second embodiment is obviously applicable to the case of the base station apparatus set to use any number of downlink component carriers for communication with the mobile station apparatus. In the second embodiment, it is assumed that the base station apparatus and the mobile station apparatus transmit/receive PDCCHs and PDSCHs mapped on one or a plurality of downlink component carriers out of five downlink component carriers.

FIG. 8 depicts an example of mapping relationship between ACK, NACK, and DTX for PDSCHs or PDCCHs transmitted on the respective downlink component carriers and bits (information bits) indicative of these pieces of information. A table of FIG. 8(A) depicts the mapping relationship between ACK/NACK and bits indicative of these pieces of information and, by way of example, a bit "0" and a bit "1" are mapped to ACK and NACK, respectively. In this bit allocation to ACK and NACK, the bit "1" and the bit "0" may be mapped to ACK and NACK, respectively. ACK/NACK may be indicated not only by one bit as described above but also by two or more bits and, for example, two bits "00" and two bits "11" may be mapped to ACK and NACK, respectively. A table of FIG. 8(B) depicts the mapping relationship between DTX and bits indicative of the information and a bit "0" and a bit "1" are mapped to the presence of DTX and the absence of DTX, respectively. In the bit mapping indicative of the presence and absence of DTX, the bit "1" and the bit "0" may be mapped to the presence of DTX and the absence of DTX, respectively.

For example, if a PDCCH from the base station apparatus cannot be detected, the mobile station apparatus transmits the bit "0" as the presence of DTX (by setting the bit of the information field indicative of DTX to "0") to the base station apparatus and if a PDCCH from the base station apparatus can be detected, the mobile station apparatus transmits the bit "1" as the absence of DTX (by setting the bit of the information field indicative of DTX to "1") to the base station apparatus.

FIG. 9 depicts an example of mapping relationship between ACK, NACK, DTX and bits indicative thereof when two CWs are applied to PDSCH on the respective downlink component carriers at the time of MIMO transmission. The mobile station apparatus transmits ACK/NACK for each CW of PDSCH on the respective downlink component carriers at the time of MIMO transmission. That is, the mobile station apparatus transmits ACK/NACK for each CW transmitted from the base station apparatus. For example, if two CWs are transmitted from the base station apparatus, the mobile station apparatus transmits two pieces of ACK/NACK for each CW.

A table of FIG. 9(A) depicts the mapping relationship between two-bit ACK/NACK and bits indicative thereof and it is depicted that bits "00" are mapped to ACK, ACK, that bits "01" are mapped to ACK, NACK, that bits "10" are mapped to NACK, ACK, and that bits "11" are mapped to NACK, NACK. The mapping to ACK/NACK represented by two information bits is not limited thereto; for example, the bits "11" may be mapped to ACK, ACK; the bits "10" may be mapped to ACK, NACK; the bits "01" may be mapped to NACK, ACK; and the bits "00" may be mapped to NACK, NACK. ACK/NACK may be indicated not only by two bits as described above but also by three or more bits; for example, three bits "000" may be mapped to ACK, ACK; three bits "010" may be mapped to ACK, NACK; three bits "101" may be mapped to NACK, ACK; and three bits "111" may be mapped to NACK, NACK.

A table of FIG. 9(B) depicts the mapping relationship between DTX and bits (information bits) indicative of the information and a bit "0" and a bit "1" are mapped to the presence of DTX and the absence of DTX, respectively. In the bit mapping indicative of the presence and absence of DTX, the bit "1" and the bit "0" may be mapped to the presence of DTX and the absence of DTX, respectively. With regard to the bit mapping of ACK, NACK, and DTX, if only one CW is used for transmission on each of downlink component carriers, FIG. 8 is applicable, and if two or more CWs are used for transmission on each of downlink component carriers, FIG. 9 is applicable.

Figure 10:
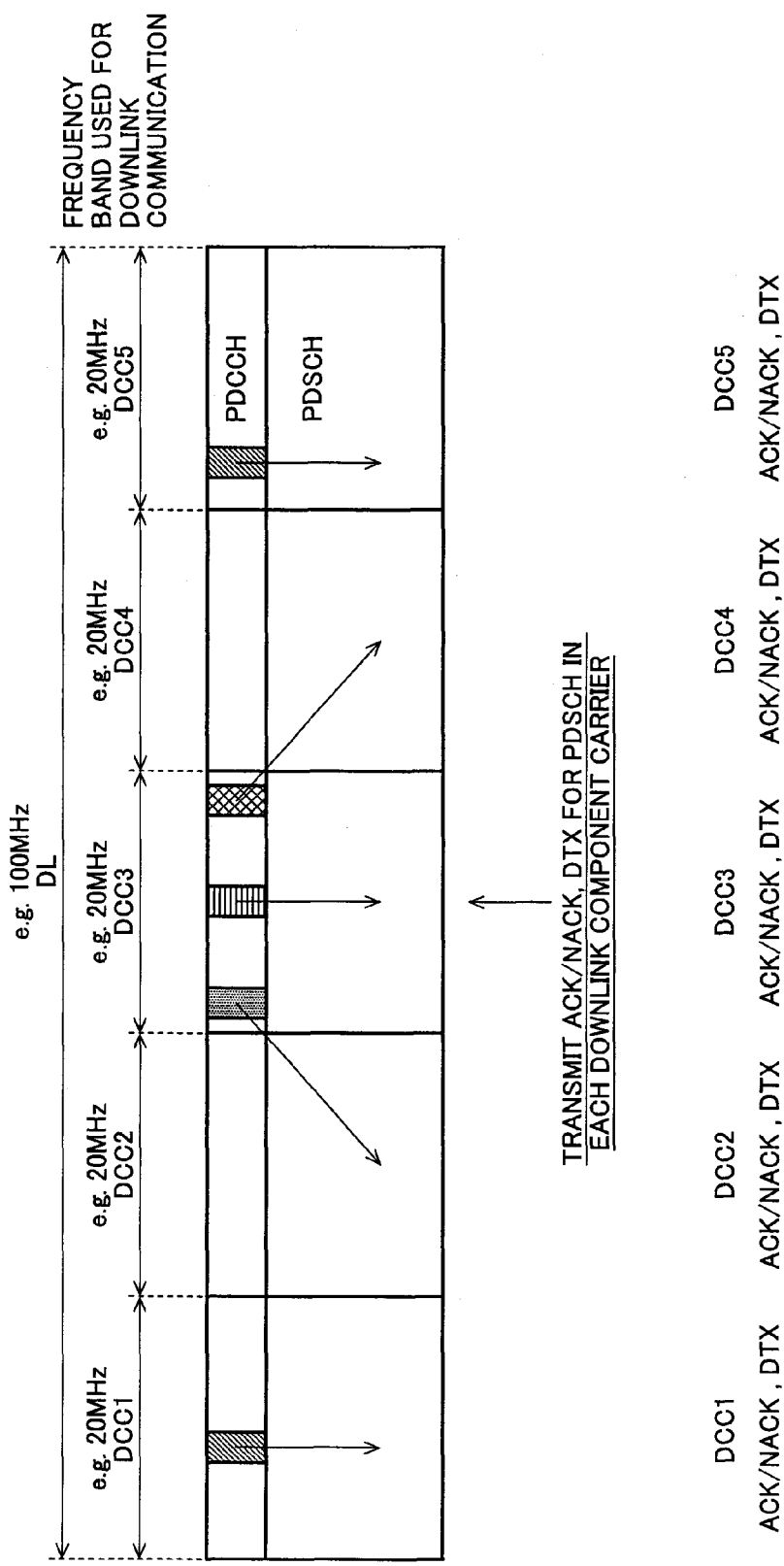
FIG. 10 is a diagram of an example of relationship of downlink control channels, downlink shared channels, and ACK, NACK, and DTX for the channels implementable in the second embodiment and the third embodiment.
Figure 13:
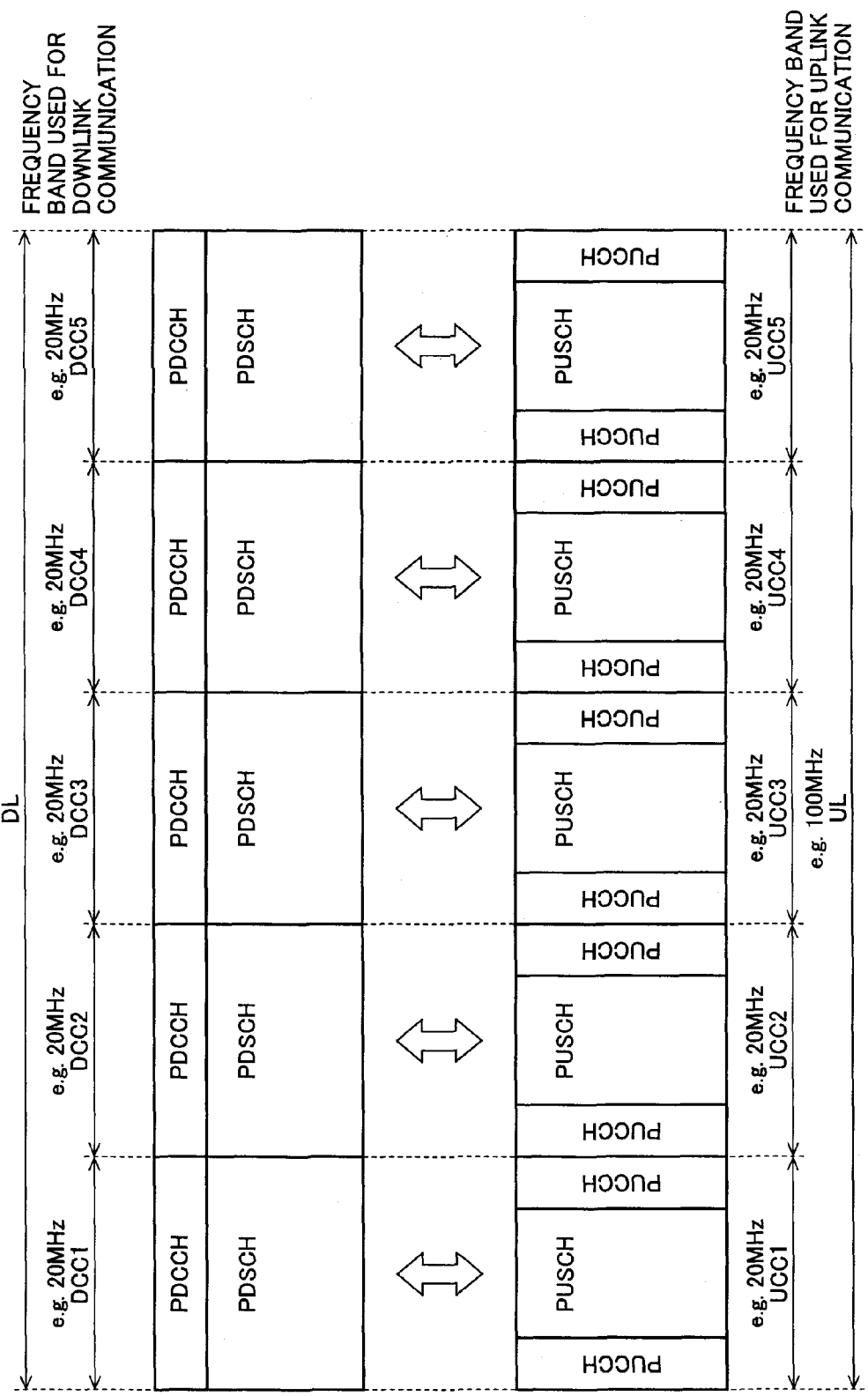
FIG. 13 is a diagram of an example of frequency band aggregation in a conventional technique.
Figure 14:
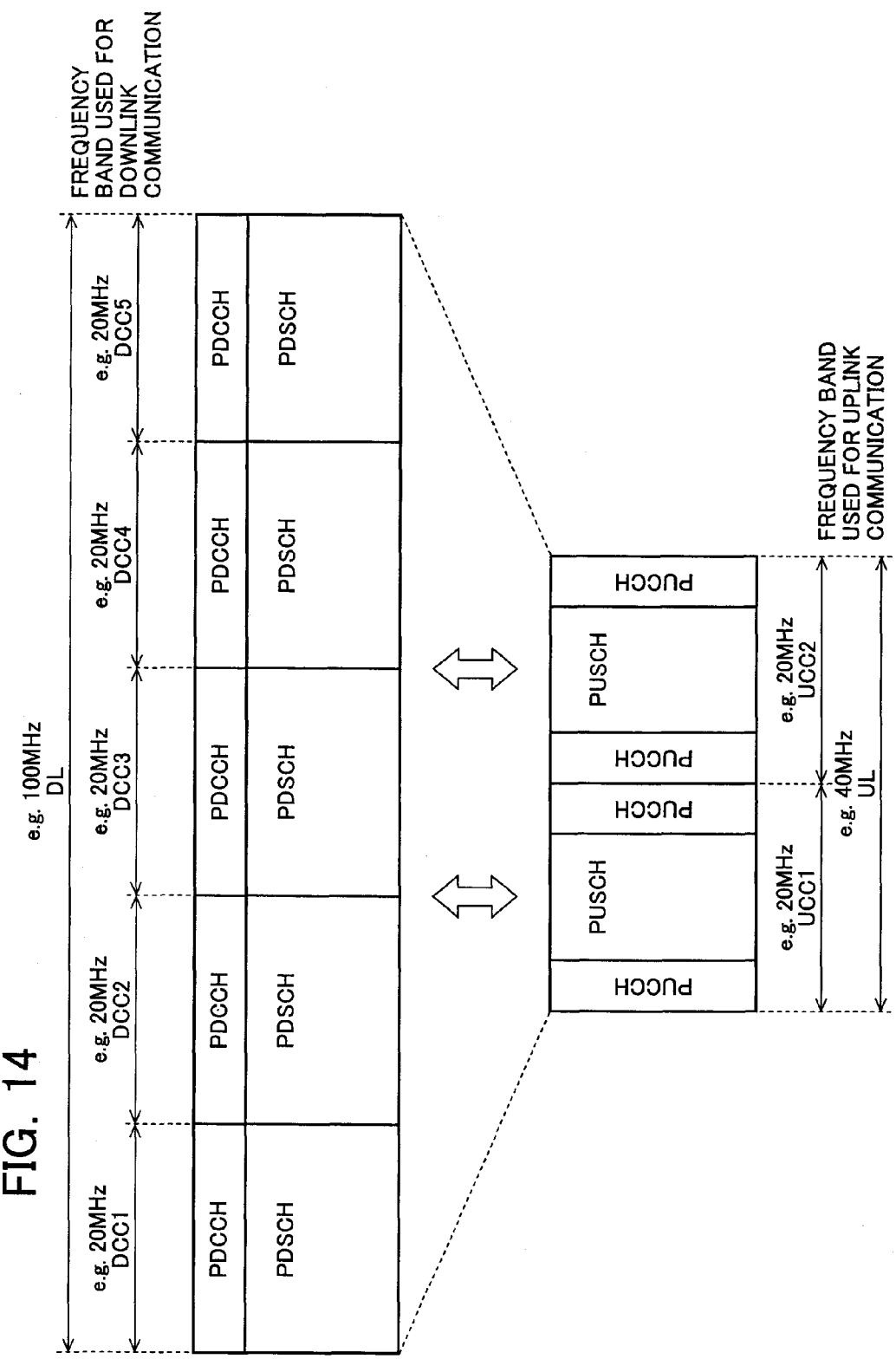
FIG. 14 is a diagram of an example of asymmetric frequency band aggregation in a conventional technique.

FIG. 10 is a diagram for explaining the operation of the mobile station apparatus in case that the base station apparatus is set to use five downlink component carriers for communication with the mobile station apparatus. In FIG. 10, the base station apparatus uses PDSCHs mapped on the five respective downlink component carriers to transmit (up to) five downlink transport blocks in the same sub-frame to the mobile station apparatus.

In FIG. 10, the mobile station apparatus is notified of allocation of a PDSCH on DCC1 by a PDCCH indicated by diagonal lines to the lower left side in DCC1, is notified of allocation of a PDSCH on DCC2 by a PDCCH indicated by horizontal lines in DCC3, is notified of allocation of a PDSCH on DCC3 by a PDCCH indicated by grid lines in DCC3, is notified of allocation of a PDSCH on DCC4 by a PDCCH indicated by mesh lines in DCC3, and is notified of allocation of PDSCH on DCC5 by a PDCCH indicated by diagonal lines to the upper right side in DCC5. Although the downlink component carriers in DCC1 to DCC5 may be arranged in any order, the downlink component carriers are arranged in ascending (descending) order from the lowest (highest) frequency, for example.

On the assumption that the base station apparatus performs transmission through a PDSCH on each of DCC1 to DCC5, it is assumed that DCC1 to DCC5 are set to the mobile station apparatus, that the mobile station apparatus is notified of the allocation of PDSCHs on the respective downlink component carriers from DCC1 to DCC5 by PDCCHs, and that ACK/NACK and DTX are transmitted for a PDSCH and/or a PDCCH on each of DCC1 to DCC5 if the base station apparatus performs the transmission of PDSCHs.

The mobile station apparatus transmits ACK/NACK and DTX for PDSCHs and/or downlink transport blocks (which may be PDSCHs) transmitted by using the five downlink component carriers from the base station apparatus. In this case, the mobile station apparatus transmits ACK/NACK and DTX for each of PDSCHs and/or each of downlink transport blocks (which may be PDSCHs) transmitted by using the five downlink component carriers.

The mobile station apparatus represents the pieces of information indicative of ACK/NACK and information indicative of DTX distinctively from each other for transmission to the base station apparatus. For example, the mobile station apparatus sets the information indicative of DTX for the PDCCH transmitted through DCC1 and the information indicative of ACK/NACK for the downlink transport block transmitted through DCC1 in respective different information fields (e.g., two information fields) for transmission to the base station apparatus. Similarly, the mobile station apparatus sets the information indicative of DTX for the PDCCH transmitted through DCC2 and the information indicative of ACK/NACK for the downlink transport block transmitted through DCC2 in respective different information fields (e.g., two information fields) for transmission to the base station apparatus. Similarly, the mobile station apparatus sets the information indicative of DTX for the PDCCH transmitted through DCC3 and the information indicative of ACK/NACK for the downlink transport block transmitted through DCC3 in respective different information fields (e.g., two information fields) for transmission to the base station apparatus. Similarly, the mobile station apparatus sets the information indicative of DTX for the PDCCH transmitted through DCC4 and the information indicative of ACK/NACK for the downlink transport block transmitted through DCC4 in respective different information fields (e.g., two information fields) for transmission to the base station apparatus. Similarly, the mobile station apparatus sets the information indicative of DTX for the PDCCH transmitted through DCC5 and the information indicative of ACK/NACK for the downlink transport block transmitted through DCC5 in respective different information fields (e.g., two information fields) for transmission to the base station apparatus.

In other words, the mobile station apparatus set to perform communication using the five downlink component carriers from the base station apparatus sets the HARQ control information (ACK/NACK, DTX) for PDCCHs and/or downlink transport blocks transmitted through the respective downlink component carriers in respective different information fields (e.g., ten information fields) for transmission to the base station apparatus.

For example, the mobile station apparatus represents and sets the HARQ control information for the PDCCH and/or the downlink transport block transmitted through DCC1, the HARQ control information for the PDCCH and/or the downlink transport block transmitted through DCC2, the HARQ control information for the PDCCH and/or the downlink transport block transmitted through DCC3, the HARQ control information for the PDCCH and/or the downlink transport block transmitted through DCC4, and the HARQ control information for the PDCCH and/or the downlink transport block transmitted through DCC5, as a combination of these pieces of information in eight information field for transmission to the base station apparatus (if one information field can transmit one-bit information, 256 combinations can be represented by using eight information fields).

Although the second embodiment will hereinafter be described as the case of the mobile station apparatus transmitting the HARQ control information in ten information fields, the mobile station apparatus may represent the HARQ control information as a combination and may use, for example, eight information fields for transmission to the base station apparatus as described above.

FIG. 11 depicts an example of ACK/NACK and DTX mapped on PUSCH resources or PUCCH resources in case that the base station apparatus is set to use five downlink component carriers for communication with the mobile station apparatus and PDCCHs and/or PDSCHs are mapped on five respective downlink component carriers. Numbers of respective mappings indicate the order of mapping of pieces of information and, for example, it is indicated that DTX or ACK/NACK is mapped on ascending order from 1 to 10.

This example of mapping of information indicative of ACK/NACK or information indicative of DTX on PUSCH resources or PUCCH resources indicates an example of mapping in a matrix before mapping pieces of the information on the PUSCH resources or the PUCCH resources (e.g., matrix expressed by the row index and the column index before the DFT processing). For example, the mobile station apparatus sequentially maps the information indicative of ACK/NACK or the information indicative of DTX for PDCCHs and/or downlink transport blocks transmitted on a plurality of component carriers in the time axis direction (e.g., direction of the row index in the matrix before the DFT processing) and then in the frequency axis direction (direction of the column index in the matrix before the DFT processing) after the information indicative of ACK/NACK or the information indicative of DTX is mapped in all the areas (e.g., all the SC-FDMA symbols) in the time axis direction (after the information indicative of ACK/NACK or the information indicative of DTX is mapped on 12 SC-FDMA symbols except RS) (referred to as time-first mapping). Although this matrix has the same configuration as the arrangement of resource elements, the matrix is eventually spread in the frequency direction because, for example, the DFT processing is executed for this matrix.

As depicted in FIG. 11(A), in one example of mapping of ACK, NACK, and DTX, first, DTXs of DCC1 to DCC5 corresponding to respective PDSCHs on the downlink component carriers (DCC1 to DCC5) are mapped in the order of the downlink component carriers and ACKs/NACKs of DCC1 to DCC5 corresponding to respective PDSCHs on the downlink component carriers (DCC1 to DCC5) are subsequently mapped in the order of the downlink component carriers. The order of mappings of DTX and ACK/NACK may be the reverse order, in which the mapping of respective DTXs corresponding to PDSCHs on downlink component carriers is followed by the mapping of ACKs/NACKs corresponding to PDSCHs.

On the other hand, as depicted in FIG. 11(B), in another example of mapping of ACK, NACK, and DTX, first, DTX and ACK/NACK corresponding to a PDSCH on DCC1 are sequentially mapped. DTX and ACK/NACK corresponding to a PDSCH on DCC2 are then mapped in this order, and DTX and ACK/NACK corresponding to a PDSCH on DCC3 are then mapped in this order. DTX and ACK/NACK corresponding to a PDSCH on DCC4 are subsequently mapped in this order. DTX and ACK/NACK corresponding to a PDSCH on DCC5 are finally mapped. The order of mappings of DTX and ACK/NACK on each DCC may be reversed.

By setting ACK/NACK and DTX independently of each other in this way, the base station apparatus can immediately determine ACK, NACK, and DTX, and the mobile station apparatus and the base station apparatus are not required to retain a larger table. Since the mobile station apparatus and the base station apparatus are not required to retain a larger table, a memory for retaining the table can be made smaller and the mobile station apparatus and the base station apparatus can be simplified.

As described above, the mobile station apparatus sets ACKs/NACKs and DTXs for respective PDCCHs and/or downlink transport blocks transmitted on respective downlink component carriers in different information fields for transmission to the base station apparatus. For example, if the base station apparatus sets five downlink component carriers used for communication, the mobile station apparatus uses ten information fields to transmit ACK/NACK or DTX.

In this case, the base station apparatus can set a downlink component carrier to which a PDSCH may be allocated in downlink to the mobile station apparatus. For example, the base station apparatus uses the RRC signaling to set a set of downlink component carriers to which PDSCHs may be allocated in downlink to the mobile station apparatus (hereinafter, this set of downlink component carriers is also referred to as a downlink component carrier set (DCC set)). For example, the base station apparatus can transmit to the mobile station apparatus the RRC signaling including information of adding and/or removing a downlink component carrier(s) to semi-statically set the DDC set (to add and/or remove a downlink component carrier(s)).

The base station apparatus can transmit to the mobile station apparatus the information of activating and/or deactivating a downlink component carrier(s) (the information indicating activation and/or deactivation of a downlink component carrier(s)) to activate and/or deactivate a set of downlink component carriers (hereinafter, this set of downlink component carriers is also referred to as a downlink component carrier active set (DCC active set)). For example, the base station apparatus can specify a set of downlink component carriers to be activated and/or deactivated in downlink to the mobile station apparatus through a PDCCH or a MAC (medium access control) control element (signal transmitted/received through the MAC layer).

For example, the base station apparatus can set DCC1, DCC2, DCC3, DCC4, and DCC5 as the DCC set for the mobile station apparatus and can specify DCC1, DCC3, and DCC5 as the DCC active set for the mobile station apparatus. Alternatively, the base station apparatus can set DCC1, DCC2, DCC3, DCC4, and DCC5 as the DCC set for the mobile station apparatus and can activate DCC1, DCC2, DCC3, DCC4, and DCC5 as the DCC active set at certain timing (e.g., at the timing of reception of downlink data (DL-SCH)).

That is, the DCC active set is a set as downlink component carriers within the DCC set. The base station apparatus can also set the DCC active set as downlink component carriers in which the mobile station apparatus attempts to detect a PDCCH (monitors a PDCCH).

Although description will hereinafter be made of the case of the base station apparatus setting DCC1, DCC2, DCC3, DCC4, and DCC5 as the DCC set for the mobile station apparatus and specifying DCC1, DCC3, and DCC5 as the DCC active set for the mobile station apparatus by way of example, the same operation is obviously performed if the base station apparatus sets/specifies other downlink component carriers as the DCC set or the DCC active set.

The base station apparatus sets DCC1, DCC2, DCC3, DCC4, and DCC5 as the DCC set and specifies DCC1, DCC3, and DCC5 as the DCC active set for the mobile station apparatus. Therefore, the base station apparatus can use the PDCCHs mapped on DCC1, DCC3, and DCC5 specified as the DCC active set to allocate the PDSCHs. For example, the base station apparatus uses the PDCCHs mapped respectively on DCC1, DCC3, and DCC5 to allocate the PDSCHs mapped respectively on DCC1, DCC3, and DCC5 and transmits (up to) three downlink transport blocks in the same sub-frame to the mobile station apparatus.

The mobile station apparatus transmits the HARQ control information for PDCCHs and/or downlink transport blocks transmitted from the base station apparatus. In this case, the mobile station apparatus sets the information indicative of DTX (the presence of DTX) in an information field which is mapped to the HARQ control information corresponding to the downlink component carrier (s) deactivated by the base station apparatus, and transmits it to the base station apparatus.

For example, if the mobile station apparatus transmits ACK for the downlink transport block transmitted on DCC1, NACK for the downlink transport block transmitted on DCC3, and ACK for the downlink transport block transmitted on DCC5, the mobile station apparatus sets, (absence of DTX, ACK) for DCC1, (presence of DTX, NACK) for DCC2, (absence of DTX, NACK) for DCC3, (presence of DTX, NACK) for DCC4, and (absence of DTX, NACK) for DCC5, in ten information fields for transmission to the base station apparatus. In case of transmitting the presence of DTX to the base station apparatus, the mobile station apparatus sets NACK in an information field in which the information indicative of ACK/NACK is set, and transmits it to the base station apparatus.

That is, the mobile station apparatus ensures the size of information fields for transmission of the HARQ control information based on the number of the downlink component carriers set as the DCC set by the base station apparatus. For example, for the information fields for transmission of the HARQ control information, the mobile station apparatus ensures the information fields twice the number of the downlink component carriers set as the DCC set by the base station apparatus. For example, if five downlink component carriers are set as the DCC set by the base station apparatus, the mobile station apparatus ensures ten information fields, and if three downlink component carriers are set as the DCC set by the base station apparatus, the mobile station apparatus ensures six information fields.

After ensuring the size of information fields corresponding to the number of downlink component carriers set as the DCC set by the base station apparatus, the mobile station apparatus sets the information indicative of DTX (the presence of DTX) in the ensured information field based on the DCC active set specified by the base station apparatus, and transmits it to the base station apparatus. That is, the mobile station apparatus sets the presence of DTX in the information field which is mapped to the HARQ control information corresponding to the downlink component carrier(s) not activated by the base station apparatus, and transmits it to the base station apparatus. In case of transmitting the presence of DTX to the base station apparatus, the mobile station apparatus sets NACK in the information field in which the information indicative of ACK/NACK is set, and transmits it to the base station apparatus.

In case that the mobile station apparatus ensures the size of information fields which is mapped to the HARQ control information based on the DCC set that is set by the base station apparatus in this way, the size of information fields can easily be ensured without the need of rapidly changing the size of the information fields. For example, in case that the mobile station apparatus ensures the size of information fields for transmission of the HARQ control information based on the DCC set that is set by the RRC signaling from the base station apparatus, the size of information fields can be ensured with higher reliability. Since the mobile station apparatus reliably ensures the size of information fields for transmission of the HARQ control information, the base station apparatus and the mobile station apparatus can transmit/receive the HARQ control information with higher reliability (e.g., inconsistency can be avoided such as that caused in case that the base station apparatus considers that uplink data (UL-SCH) is set in a certain information field while the mobile station apparatus considers the HARQ control information is set in the certain information field).

Here, if a PDCCH cannot be detected (DTX is present), the mobile station apparatus may set the information indicative of whether a downlink component carrier is activated or deactivated in the information field in which the information indicative of ACK/NACK is set, and transmit it to the base station apparatus.

Therefore, if a PDCCH from the base station apparatus is detected (DTX is absent), the mobile station apparatus can set the information indicative of ACK/NACK in a certain information field. And if a PDCCH from the base station apparatus cannot be detected (DTX is present), the mobile station apparatus can set the information indicative of activation/deactivation of a downlink component carrier in the certain information field. The mobile station apparatus can switch the information set in the certain information field (the information indicative of ACK/NACK or the information indicative of activation/deactivation of a downlink component carrier) based on whether a PDCCH from the base station apparatus is detected, and transmit it to the base station apparatus.

For example, in case that the base station apparatus specifies DCC1, DCC3, and DCC5 as the DCC active set, if ACK, DTX (presence of DTX), and NACK are transmitted for the downlink transport block transmitted on DCC1, the PDCCH transmitted on DCC3, and the downlink transport block transmitted on DCC5, respectively, the mobile station apparatus sets, (absence of DTX, ACK) for DCC1, (presence of DTX, deactivate) for DCC2, (presence of DTX, activate) for DCC3, (presence of DTX, deactivate) for DCC4, and (absence of DTX, ACK) for DCC5, in ten information fields for transmission to the base station apparatus.

By receiving the information indicating that a PDCCH is detected (absence of DTX) from the mobile station apparatus, the base station apparatus can determine that the corresponding downlink component carrier is activated. In case of transmitting the information indicating that a PDCCH cannot be detected (presence of DTX), the mobile station apparatus can also transmit a status of a downlink component carrier (activated or deactivated) to notify the base station apparatus of whether the PDCCH cannot be detected in the situation where the downlink component carrier is activated or the PDCCH cannot be detected in the situation where the downlink component carrier is deactivated.

By transmitting the information indicative of activation/deactivation of a downlink component carrier from the mobile station apparatus in case of transmitting the information indicative of DTX (presence of DTX), the inconsistency in activated/deactivated downlink component carriers can be avoided between the base station apparatus and the mobile station apparatus (e.g., inconsistency can be avoided such as that caused in case that the base station apparatus considers that a certain downlink component carrier is activated while the mobile station apparatus considers that the certain downlink component carrier is deactivated).

By setting the information indicative of ACK/NACK in a certain information field if a PDCCH can be detected, and setting the information indicative of activation/deactivation of a downlink component carrier in the certain information field if a PDCCH cannot be detected, it becomes possible to communalize the information fields that are used for the information indicative of ACK/NACK and the information indicative of activation/deactivation of a downlink component carrier. And the information indicative of ACK/NACK or the information indicative of activation/deactivation of a downlink component carrier can more efficiently be transmitted to the base station apparatus. In other words, it is not necessary to provide both the information field used for the information indicative of ACK/NACK and the information field used for the information indicative of activation/deactivation of downlink component carriers.

As described above, in case that the base station apparatus and the mobile station apparatus performing communication by using a wide frequency band made up of a plurality of component carriers transmit/receive the HARQ control information, the mobile station apparatus can explicitly transmit the HARQ control information by transmitting the HARQ control information using the PUSCH resource or the PUCCH resource allocated by the base station apparatus, thereby preventing unnecessary retransmission of the HARQ control information.

(Third Embodiment)

A third embodiment of the present invention will next be described. In the third embodiment, the base station apparatus allocates a PUSCH resource for transmission of HARQ control information by the mobile station apparatus, and the mobile station apparatus uses the PUSCH resource to transmit the HARQ control information to the base station apparatus.

The base station apparatus allocates a PUCCH resource for transmission of the HARQ control information for a plurality of downlink component carriers by the mobile station apparatus, and the mobile station apparatus uses the PUCCH resource to transmit the HARQ control information to the base station apparatus.

The HARQ control information transmitted by the mobile station apparatus is made up of information indicative of ACK/NACK and information indicative of DTX.

In the HARQ control information transmitted by the mobile station apparatus, the information indicative of ACK/NACK, DTX is transmitted through resources on the uplink component carriers corresponding to the downlink component carriers set by the base station apparatus.

In the HARQ control information transmitted by the mobile station apparatus, the number of bits of the information indicative of DTX is represented as the number of bits that is smaller by one bit than the number of the downlink component carriers set by the base station apparatus.

The example of the mobile communication system depicted in FIG. 6 is also applicable to the third embodiment. The sequence chart of transmission/reception of the HARQ control information by the base station apparatus and the mobile station apparatus depicted in FIG. 7 is also applicable.

A difference from the second embodiment is in the method of mapping the HARQ control information on a PUSCH at 703 of FIG. 7. Although the number of bits indicative of DTX is the same as the number of the allocated downlink component carriers in the second embodiment, the number of bits indicative of DTX is smaller by one bit than the number of the allocated downlink component carriers in the third embodiment.

With regard to the bit mapping of ACK, NACK, and DTX, if only one CW is used for transmission on each of downlink component carriers, FIG. 8 is applicable, and if two or more CWs are used for transmission on each of downlink component carriers, FIG. 9 is applicable.

In the following description, it is assumed that a PUSCH resource for transmitting the HARQ control information is correspond to any one of five downlink component carriers, which is DCC3 in this case. The correspondence between DCC3 and the PUSCH resource for transmitting the HARQ control information indicates that the PUSCH resource notified by the RRC signaling is correspond to DCC3, for example.

The bit representation of ACK, NACK, and DTX will then be described when five downlink component carriers are set with PDSCHs mapped on the five respective downlink component carriers.

The example depicted in FIG. 10 is also applicable that represents a relationship between PDCCHs and PDSCHs and a relationship of transmission of ACK, NACK, and DTX to each of the downlink component carriers when five downlink component carriers are set with PDSCHs mapped on the five respective downlink component carriers.

FIG. 12 depicts two examples of mapping of PUSCHs if ACK/NACK and DTX are indicated when five downlink component carriers are set with PDSCHs mapped on the five respective downlink component carriers. Numbers of respective mappings indicate the order of mapping and, for example, it is indicated that DTX or ACK/NACK is mapped in ascending order from 1 to 9.

As depicted in FIG. 12(A), in one example of mapping of ACK, NACK, and DTX, first, DTXs of DCC1, DC2, DCC4, and DCC5 corresponding to respective PDSCHs on the downlink component carriers (DCC1 to DCC5) are mapped in the order of the downlink component carriers and ACKs/NACKs of DCC1 to DCC5 corresponding to respective PDSCHs on the downlink component carriers (DCC1 to DCC5) are subsequently mapped in the order of the downlink component carriers. The order of mappings of DTX and ACK/NACK may be the reverse order, in which the mapping of respective DTXs corresponding to PDSCHs on downlink component carriers is followed by the mapping of ACKs/NACKs corresponding to PDSCHs.

On the other hand, as depicted in FIG. 12(B), in another example of mapping of ACK, NACK, and DTX, first, DTX and ACK/NACK corresponding to a PDSCH on DCC1 are sequentially mapped. DTX and ACK/NACK corresponding to a PDSCH on DCC2 are then mapped in this order, and DTX and ACK/NACK corresponding to a PDSCH on DCC3 are then mapped in this order. DTX and ACK/NACK corresponding to a PDSCH on DCC4 are subsequently mapped in this order. DTX and ACK/NACK corresponding to a PDSCH on DCC5 are finally mapped. The order of mappings of DTX and ACK/NACK on each DCC may be reversed.

By mapping ACK/NACK and DTX independently of each other in this way, the base station apparatus can immediately determine ACK, NACK, and DTX, and the mobile station apparatus and the base station apparatus are not required to retain a larger table. Since the mobile station apparatus and the base station apparatus are not required to retain a larger table for detecting ACK/NACK and DTX, a memory required for retaining the table can be reduced and the mobile station apparatus and the base station apparatus can be simplified.

As described above, in case that the base station apparatus and the mobile station apparatus performing communication by using a wide frequency band made up of a plurality of component carriers transmit/receive the HARQ control information, the mobile station apparatus can explicitly transmit the HARQ control information by transmitting the HARQ control information using the PUSCH resource or the PUCCH resource allocated by the base station apparatus, thereby preventing unnecessary retransmission of the HARQ control information.

The methods of mapping DTX an ACK/NACK described in the first to third embodiments can also be utilized in case that an UL-SCH and ACK are transmitted at the same time on a PUSCH.

A program running on the mobile station apparatus 400 and the base station apparatus 500 according to the present invention may be a program controlling a CPU (central processing unit) (program causing a computer to function) such that the functions of the embodiments according to the present invention are implemented. Information handled by these apparatuses is temporarily accumulated in a RAM (random access memory) when it is processed, is subsequently stored in various ROMs such as a flash ROM (read only memory) and HDDs (hard disk drives), and is read and modified/rewritten by the CPU as needed.

Portions of the mobile station apparatus 400 and the base station apparatus 500 in the embodiments may be implemented by a computer. In this case, a program for implementing the control function may be recorded in a computer readable recording medium and the program recorded in this recording medium may be read and executed by a computer system for the implementation. A "computer system" as used herein is a computer system built into the mobile station apparatus 200 or the base station apparatus 100 and is assumed to include OS and hardware such as peripherals.

A "computer readable recording medium" means a portable medium such as a flexible disk, a magnetic optical disk, a ROM, and a CD-ROM, and a storage device such as a hard disk built into a computer system. A "computer readable recording medium" may include those dynamically retaining a program for a short time like a network such as the Internet and communication wires when a program is transmitted through a communication line such as a telephone line, and those retaining a program for a certain time period like a volatile memory within a computer system acting as a server or a client in this case. The program may be for the purpose of implementing a portion of the functions and may be a program capable of implementing the functions in combination with a program already recorded in a computer system.

A portion or whole of the mobile station apparatus 400 and the base station apparatus 500 in the embodiments may be implemented as LSI (Large Scale Integration) that is typically an integrated circuit. The functional blocks of the mobile station apparatus 200 and the base station apparatus 100 may individually be formed as chips, or a portion or all of the functional blocks may be integrated into a chip. A technique of forming an integrated circuit may be implemented not only in LSI but also in a dedicated circuit or a general purpose processor. If advance in semiconductor technology leads to emergence of a technique of forming an integrated circuit alternative to LSI, the integrated circuit from the technique is also usable.

A radio communication system using the mobile station apparatus according to the present invention can use the following means. In the radio communication system, i.e., the radio communication system having a base station apparatus and a mobile station apparatus performing radio communication by using a plurality of component carriers, a PUSCH resource is allocated for transmission of the HARQ control information by the mobile station apparatus, and the mobile station apparatus transmits the HARQ control information to the base station apparatus by utilizing the PUSCH resource.

In the mobile communication system having a base station apparatus and a mobile station apparatus performing communication by using a plurality of downlink component carriers, the base station apparatus allocates a PUSCH resource for transmission of the HARQ control information for a plurality of downlink component carriers by the mobile station apparatus, and the mobile station apparatus transmits the HARQ control information to the base station apparatus by utilizing the PUSCH resource.

The HARQ control information transmitted by the mobile station apparatus is made up of information indicative of ACK/NACK and information indicative of DTX.

In the HARQ control information transmitted by the mobile station apparatus, the number of bits of information indicative of DTX is the number of bits same as that of downlink component carriers set by the base station apparatus.

In the HARQ control information transmitted by the mobile station apparatus, the information indicative of DTX is transmitted through a resource in an uplink component carrier corresponding to the downlink component carriers set in advance by the base station apparatus.

In the HARQ control information transmitted by the mobile station apparatus, the number of bits of the information indicative of DTX is the number of bits smaller by one bit than the number of the downlink component carriers set by the base station apparatus.

In a mobile station apparatus in a mobile communication system having a base station apparatus and the mobile station apparatus performing communication by using a plurality of downlink component carriers, a PUSCH resource for transmission of the HARQ control information by the mobile station apparatus is allocated from the base station apparatus, and the mobile station apparatus transmits the HARQ control information to the base station apparatus by utilizing the PUSCH resource.

In a communication method of a mobile station apparatus in a mobile communication system having a base station apparatus and the mobile station apparatus performing communication by using a plurality of downlink component carriers, a PUSCH resource for transmission of the HARQ control information by the mobile station apparatus is allocated from the base station apparatus, and the mobile station apparatus transmits the HARQ control information to the base station apparatus by utilizing the PUSCH resource.

An integrated circuit mounted on a base station apparatus and enabling the base station apparatus to achieve a plurality of functions drives the base station apparatus to achieve a function of performing communication by using a plurality of downlink component carriers and a function of allocating a PUSCH resource for transmitting HARQ to a mobile station apparatus.

An integrated circuit mounted on a mobile station apparatus and enabling the mobile station apparatus to achieve a plurality of functions drives the mobile station apparatus to achieve a function of performing radio communication with a base station apparatus by using a plurality of component carriers; a function of measuring a reception state of the downlink transport blocks; a function of generating the HARQ control information for PDSCHs (physical downlink shared channels) and/or PDCCHs (physical downlink control channels) based on the reception state of the downlink transport blocks; and a function of transmitting to the base station apparatus the generated HARQ control information by utilizing a PUSCH resource allocated by the base station apparatus.

Although the exemplary embodiments of the present invention have been described in detail with reference to the drawings, specific configurations are not limited to the embodiments and various changes in design etc., may be made within a range not departing from the spirit of the present invention.

EXPLANATIONS OF LETTERS OR NUMERALS

400 . . . base station apparatus; 401 . . . data control portion; 402 . . . OFDM modulating portion; 403 . . . radio portion; 404 . . . scheduling portion; 405 . . . channel estimating portion; 406 . . . DFT-S-OFDM demodulating portion; 407 . . . data extracting portion; 408 . . . higher layer; 409 . . . radio resource control portion; 500 . . . mobile station apparatus; 501 . . . data control portion; 502 . . . DFT-S-OFDM modulating portion; 503 . . . radio portion; 504 . . . scheduling portion; 505 . . . channel estimating portion; 506 . . . OFDM demodulating portion; 507 . . . data extracting portion; 508 . . . higher layer; and 509 . . . radio resource control portion.

The invention claimed is:

1. A mobile station apparatus configured to communicate with a base station apparatus, the mobile station apparatus comprising:
a receiving unit configured to receive, from the base station apparatus, a Radio Resource Control (RRC) signal including first information for configuring one or more downlink component carriers, wherein
the receiving unit configured to receive, from the base station apparatus, an RRC signal including second information for configuring four physical uplink control channel resources,
the receiving unit configured to receive, from the base station apparatus, a Medium Access Control (MAC) control element including third information for activating or deactivating of each of the one or more downlink component carriers which are configured by using the first information, and
the receiving unit configured to receive on a physical downlink control channel, from the base station apparatus, fourth information for indicating one physical uplink control channel resource, the one physical uplink control channel resource being among the four physical uplink control channel resources which are configured by using the second information; and
a transmitting unit configured to transmit in a subframe, to the base station apparatus, HARQ (Hybrid Automatic Repeat reQuest) control information using the one physical uplink control channel resource, the HARQ control information indicating a positive acknowledgement (ACK) or a negative acknowledgement (NACK), wherein
the number of ACK/NACK bits indicated by the HARQ control information is determined based on the number of the one or more downlink component carriers which are configured by using the first information,
the NACK is generated for an ACK/NACK bit indicated by the HARQ control information for each of the one or more downlink component carriers which are deactivated by using the third information, and
the number of the ACK/NACK bits indicated by the HARQ control information does not change due to deactivation of a downlink component carrier.

2. The mobile station apparatus according to claim 1, wherein the ACK or the NACK is generated for an ACK/NACK bit indicated by the HARQ control information for an activated downlink component carrier of the plurality of downlink component carriers.

3. The mobile station apparatus according to claim 1, wherein the transmitting unit is configured to transmit on a physical uplink shared channel, to the base station apparatus, an ACK/NACK bit indicated by the HARQ control information for each of the plurality of downlink component carriers.

4. The mobile station apparatus according to claim 1, wherein no physical downlink shared channel is detected on the one or more downlink component carriers.

5. A base station apparatus configured to communicate with a mobile station apparatus, the base station apparatus comprising:
a transmitting unit configured to transmit, to the mobile station apparatus, a Radio Resource Control (RRC) signal including first information for configuring one or more downlink component carriers, wherein
the transmitting unit configured to transmit, to the mobile station apparatus, an RRC signal including second information for configuring four physical uplink control channel resources,
the transmitting unit configured to transmit, to the mobile station apparatus, a Medium Access Control (MAC) element including third information for activating or deactivating of each of the one or more downlink component carriers which are configured by using the first information, and the transmitting unit configured to transmit on a physical downlink control channel, to the mobile station apparatus, fourth information for indicating one physical uplink control channel resource, the one physical uplink control channel resource being among the four physical uplink control channel resources which are configured by using the second information; and a receiving unit configured to receive in a subframe, from the mobile station apparatus, HARQ (Hybrid Automatic Repeat reQuest) control information using the one physical uplink control channel resource, the HARQ control information indicating a positive acknowledgement (ACK) or a negative acknowledgement (NACK), wherein the number of ACK/NACK bits indicated by the HARQ control information is determined based on the number of the one or more downlink component carriers which are configured by using the first information, the NACK is generated for an ACK/NACK bit indicated by the HARQ control information for each of the one or more downlink component carriers which are deactivated by using the third information, and the number of the ACK/NACK bits indicated by the HARQ control information does not change due to deactivation of a downlink component carrier.

6. The base station apparatus according to claim 5, wherein the ACK or the NACK is received for an ACK/NACK bit indicated by the HARQ control information for an activated downlink component carrier of the plurality of downlink component carriers.

7. The base station apparatus according to claim 5, wherein the receiving unit is configured to receive on a physical uplink shared channel, from the mobile station apparatus, an ACK/NACK bit indicated by the HARQ control information for each of the plurality of downlink component carriers.

8. The base station apparatus according to claim 5, wherein no physical downlink shared channel is assigned on the one or more downlink component carriers.

9. An integrated circuit used in a mobile station apparatus configured to communicate with a base station apparatus, the integrated circuit comprising:

a receiving unit configured to receive, from the base station apparatus, a Radio Resource Control (RRC) signal including first information for configuring one or more downlink component carriers, wherein the receiving unit configured to receive, from the base station apparatus, an RRC signal including second information for configuring four physical uplink control channel resources, the receiving unit configured to receive, from the base station apparatus, a Medium Access Control (MAC) element carrying information for activation or deactivation of each of the one or more downlink component carriers of the plurality of downlink component carriers, and the receiving unit configured to receive on a physical downlink control channel, from the base station apparatus, fourth information for indicating one physical uplink control channel resource, the one physical uplink control channel resource being among the four physical uplink control channel resources which are configured by using the second information; and a transmitting unit configured to transmit in a subframe, to the base station apparatus, HARQ (Hybrid Automatic Repeat reQuest) control information using the one physical uplink control channel resource, the HARQ control information indicating a positive acknowledgement (ACK) or a negative acknowledgement (NACK), wherein the number of ACK/NACK bits indicated by the HARQ control information is determined based on the number of the one or more downlink component carriers which are configured by using the first information, the NACK is generated for an ACK/NACK bit indicated by the HARQ control information for each of the one or more downlink component carriers which are deactivated by using the third information, and the number of the ACK/NACK bits indicated by the HARQ control information does not change due to deactivation of a downlink component carrier.

10. An integrated circuit used in a base station apparatus configured to communicate with a mobile station apparatus, the integrated circuit comprising:

a transmitting unit configured to transmit, to the mobile station apparatus, a Radio Resource Control (RRC) signal including first information for configuring one or more downlink component carriers, wherein the transmitting unit configured to transmit, to the mobile station apparatus, an RRC signal including second information for configuring four physical uplink control channel resources, the transmitting unit configured to transmit, to the mobile station apparatus, a Medium Access Control (MAC) element including third information for activating or deactivating of each of the one or more downlink component carriers which are configured by using the first information, and the transmitting unit configured to transmit on a physical downlink control channel, to the mobile station apparatus, fourth information for indicating one physical uplink control channel resource, the one physical uplink control channel resource being among the four physical uplink control channel resources which are configured by using the second information; and a receiving unit configured to receive in a subframe, from the base station apparatus, HARQ (Hybrid Automatic Repeat reQuest) control information using the one physical uplink control channel resource, the HARQ control information indicating a positive acknowledgement (ACK) or a negative acknowledgement (NACK), wherein the number of ACK/NACK bits indicated by the HARQ control information is determined based on the number of the one or more downlink component carriers which are configured by using the first information, the NACK is generated for an ACK/NACK bit indicated by the HARQ control information for each of the one or more downlink component carriers which are deactivated by using the third information, and the number of the ACK/NACK bits indicated by the HARQ control information does not change due to deactivation of a downlink component carrier.

11. A communication method for a mobile station apparatus configured to communicate with a base station apparatus, the communication method comprising:

receiving, from the base station apparatus, a Radio Resource Control (RRC) signal including first information for configuring one or more downlink component carriers;

receiving, from the base station apparatus, an RRC signal including second information for configuring four physical uplink control channel resources;

receiving, from the base station apparatus, a Medium Access Control (MAC) element including third information for activating or deactivating of each of the one or more downlink component carriers which are configured by using the first information;

receiving on a physical downlink control channel, from the base station apparatus, fourth information for indicating one physical uplink control channel resource, the one physical uplink control channel resource being among the four physical uplink control channel resources which are configured by using the second information; and transmitting in a subframe, to the base station apparatus, HARQ (Hybrid Automatic Repeat reQuest) control information, the HARQ control information indicating a positive acknowledgement (ACK) or a negative acknowledgement (NACK), wherein the number of ACK/NACK bits indicated by the HARQ control information is determined based on the number of the one or more downlink component carriers which are configured by using the first information, the NACK is generated for an ACK/NACK bit indicated by the HARQ control information for each of the one or more downlink component carriers which are deactivated by using the third information, and the number of the ACK/NACK bits indicated by the HARQ control information does not change due to deactivation of a downlink component carrier.

12. A communication method for a base station apparatus configured to communicate with a mobile station apparatus, the communication method comprising:

transmitting, to the mobile station apparatus, a Radio Resource Control (RRC) signal including first information for configuring one or more downlink component carriers;

transmitting, to the mobile station apparatus, an RRC signal including second information for configuring four physical uplink control channel resources;

transmitting, to the mobile station apparatus, a Medium Access Control (MAC) element including third information for activating or deactivating of each of the one or more downlink component carriers which are configured by using the first information;

transmitting on a physical downlink control channel, to the mobile station apparatus, fourth information for indicating one physical uplink control channel resource, the one physical uplink control channel resource being among the four physical uplink control channel resources which are configured by using the second information; and receiving in a subframe, from the base station apparatus, HARQ (Hybrid Automatic Repeat reQuest) control information using the one physical uplink control channel resource, the HARQ control information indicating a positive acknowledgement (ACK) or a negative acknowledgement (NACK), wherein the number of ACK/NACK bits indicated by the HARQ control information is determined based on the number of the one or more downlink component carriers which are configured by using the first information, the NACK is generated for an ACK/NACK bit indicated by the HARQ control information for each of the one or more downlink component carriers which are deactivated by using the third information, and the number of the ACK/NACK bits indicated by the HARQ control information does not change due to deactivation of a downlink component carriers.

* * * * *

UNITED STATES PATENT AND TRADEMARK OFFICE
CERTIFICATE OF CORRECTION

PATENT NO. : 9,954,651 B2
APPLICATION NO. : 13/579219
DATED : April 24, 2018
INVENTOR(S) : Masayuki Enomoto It is certified that error appears in the above-identified patent and that said Letters Patent is hereby corrected as shown below:

In the Claims

Column 34, Line 66, after "(MAC)" insert --control--.

Column 35, Line 56, after "(MAC)" insert --control--;
  Line 57, delete "carrying" and insert --including third--;
  Line 59, delete "of" and insert --which are configured by using--;
  Line 59, delete "plurality of downlink component carriers" and insert --first information--.

Column 36, Line 31, after "(MAC)" insert --control--;
  Line 44, delete "base" and insert --mobile--.

Column 37, Line 19, after "information" insert --using the one physical uplink control channel resource--.

Column 38, Line 19, delete "base" and insert --mobile--.

Signed and Sealed this
Twenty-first Day of August, 2018

Andrei Iancu
*Director of the United States Patent and Trademark Office*